(12) United States Patent
Hiyama et al.

(10) Patent No.: US 6,963,372 B1
(45) Date of Patent: Nov. 8, 2005

(54) SOLID-STATE IMAGE SENSING APPARATUS AND METHOD OF OPERATING THE SAME

(75) Inventors: Hiroki Hiyama, Atsugi (JP); Shigetoshi Sugawa, Atsugi (JP); Isamu Ueno, Hadano (JP); Toru Koizumi, Yokohama (JP); Tetsunobu Kochi, Hiratsuka (JP); Katsuhito Sakurai, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/291,006

(22) Filed: Apr. 14, 1999

(30) Foreign Application Priority Data

Apr. 24, 1998 (JP) ................................. 10-115613
Jun. 17, 1998 (JP) ................................. 10-169924

(51) Int. Cl.[7] .......................... H04N 3/14; H04N 5/335
(52) U.S. Cl. ....................................................... 348/302
(58) Field of Search ....................................... 348/302

(56) References Cited

U.S. PATENT DOCUMENTS 5,793,423 A * 8/1998 Hamasaki ................... 348/302
5,808,677 A    9/1998 Yonemoto ................... 348/308
5,933,189 A * 8/1999 Nomura ...................... 348/302
6,037,577 A * 3/2000 Tanaka et al. ............ 250/208.1
6,037,979 A    3/2000 Yonemoto ................... 348/308
6,538,693 B1 * 3/2003 Kozuka ....................... 348/241

FOREIGN PATENT DOCUMENTS

| DE | 2528145 | 1/1976 | ............ H04N 3/14 |
| EP | 0665685 A | 8/1995 | ............ H04N 3/15 |
| JP | 5-18309 | 3/1983 | |
| JP | 58-48577 | 3/1983 | |
| JP | 4-61573 | 2/1992 | |
| JP | 4-061573 A | 2/1992 | ............ H04N 5/335 |

* cited by examiner

*Primary Examiner*—Wendy R. Garber
*Assistant Examiner*—James M. Hannett
(74) *Attorney, Agent, or Firm*—Fitzpatrick, Cella, Harper & Scinto

(57) ABSTRACT

In a solid-state image sensing apparatus, each pixel includes a photodiode, a MOS amplifier whose gate receives photo-charge generated by the photodiode, and a MOS switch for controlling connection between the photodiode and the gate of the MOS amplifier, and transference of the photo-charge from the photodiode to the gate of the MOS amplifier is performed under a condition that a channel is formed under the gate of the MOS amplifier.

6 Claims, 21 Drawing Sheets

SOLID-STATE IMAGE SENSING APPARATUS AND METHOD OF OPERATING THE SAME

BACKGROUND OF THE INVENTION

The present invention relates to a solid-state image sensing apparatus and a method of operating the same and, more particularly, to a solid-state image sensing apparatus widely used in an image input apparatus, such as a video camera and a digital still camera, and a method of driving the solid-state image sensing apparatus.

Recently, technique for reducing the cell size of a photoelectric conversion element has been actively developed for increasing resolution using refining processing. At the same time, since the level of the output signal from the photoelectric conversion element decreases as the cell size of the photoelectric conversion element is reduced, an amplification-type photoelectric conversion apparatus, capable of amplifying a photo-charge signal then outputting it, has been getting attention.

As such amplification-type photoelectric conversion apparatuses, there are metal oxide semiconductor (MOS) type, an amplified MOS imager (AMI), a charge modulation device (CMD), and a base stored image sensor (BASIS), for instance, but not a conventional charge-coupled device (CCD) type. Among these, in a MOS-type photoelectric conversion apparatus, photo-electrons generated by a photodiode, as a photoelectric conversion element, are collected at the gate of a MOS transistor, and the charge at the gate is amplified using a change in potential at the gate caused by the charge and outputted to an output unit in accordance with a driving signal from an operation circuit. Further, a complementary MOS (CMOS) type photoelectric conversion apparatus, among MOS-type photoelectric conversion apparatuses, can be manufactured in CMOS logic LSI processing, in addition, peripheral circuits can be integrally formed on the same chip easily. Furthermore, the CMOS-type photoelectric conversion apparatus can be operated with a low voltage, which saves electrical energy; therefore, it is anticipated as a useful image sensor for a portable device. Since photodiodes, i.e., photoelectric conversion elements, of the CMOS-type image sensor and their peripheral circuits are made in the CMOS logic LSI processing, the photodiodes and the peripheral circuits are collectively called a CMOS image sensor.

The CMOS image sensor has one or more MOS field effect transistors (FETs) in each cell (pixel). Especially, the CMOS image sensor having a MOS FET for amplification (referred to as "MOS amplifier" hereinafter) whose gate accumulates photo-charge in each pixel can read a carrier signal generated by the photoelectric conversion element in a predetermined period, therefore, is used for a high-sensitive image sensing apparatus.

In such a CMOS image sensor, the output signal level is increased by amplifying photo-charge using the MOS amplifier provided in each pixel; however, at the same time, irregularity in threshold voltages Vth and gain of the MOS amplifier causes deterioration of the S/N ratio. Especially, it is not possible to restrain irregularity in the threshold voltages Vth below several millivolts under the current manufacturing technique. Further, the saturation voltage of the MOS amplifier is in some volts range since the saturation voltage depends upon the voltage of the power supply. Therefore, the S/N ratio is a three-digit number at best, and it is very difficult to achieve 70 to 80 dB, which is the demand of the market.

In order to overcome the above problem, a read circuit using a capacitive clamp circuit, as shown in FIG. 17, is disclosed in the Japanese Patent Application Laid-Open No. 4-61573. FIG. 18 shows an equivalent circuit of a pixel of a solid state image sensing apparatus disclosed in the above reference. Below, the operation of the image sensing apparatus is briefly explained with reference to the equivalent circuit of a pixel shown in FIG. 18 and the timing chart shown in FIG. 19.

Referring to FIG. 18, in advance of reading of photo-charge from a photodiode D1, signals ΦCR1, ΦCR2 and ΦCS1 at time $t_{31p}$ are changed to high, thereby a MOS switch Q16 is turned on; in turn, a vertical signal line VL3 becomes a ground level, and capacitors C1 and C3 are reset to a voltage VSS. Thereafter, a signal ΦCR1 is changed to a low level at time $t_{32p}$, further, a reset signal ΦRS is changed to a high level, thereby the gate of the MOS amplifier Q2 is reset to a voltage VRS.

Then, at time $t_{33p}$ the reset signal ΦRS is changed to a low level and a signal ΦV3 is changed to high, thereby a MOS FET Q3 for selection (referred to as "MOS selector" hereinafter) is turned on, and an operation voltage VDD is provided to the drain of the MOS amplifier Q2. Accordingly, a voltage VN corresponding to the gate voltage of the MOS amplifier Q2 appears on the vertical signal line VL3 (noise signal).

Next, the signal ΦCR2 is changed to low at time $t_{34p}$, which puts the output side of the capacitor C1 and one electrode of the capacitor C3 in a floating state. At this time, the signal ΦV3 is changed to low to turn the MOS selector Q3 off. Then, the signal ΦCR1 is changed to high to reset the vertical signal line VL3, thereby the potential of the output side of the capacitor C1 and one electrode of the capacitor C3 becomes a potential, VSS–VN', that is the bias voltage VSS is reduced by a voltage VN', which is a part of the voltage VN, corresponding to the ratio of the capacitance of the capacitor C1 to the total capacitance of the capacitors C1 and C3. Here, VN' is expressed by the following equation (1).

$$VN'=C1 \times VN/(C1+C3) \tag{1}$$

Next at time $t^{35p}$, the signal ΦCR1 is changed to low, the signal ΦV3, applied to the gate of the MOS selector Q3, and a signal ΦVG, applied to the gate of a MOS FET Q1 for transferring photo-charge (referred to as "MOS switch" hereinafter), are changed to high. Accordingly, the MOS switch Q1 is turned on, and the photo-charge generated by the photodiode D1 is transferred to an input capacitor CP. At the same time, the MOS selector Q3 is turned on, and the operation voltage VDD is provided to the drain of the MOS amplifier Q2 via the MOS selector Q3, thereby a voltage VS, corresponding to the gate voltage of the MOS amplifier Q2 appears on the vertical signal line VL3 (photo-charge signal).

With the aforesaid operation, a voltage across the capacitor C1 is increased by a voltage VS', which is a part of the voltage VS, corresponding to the ratio of the capacitance of the capacitor C1 to the total capacitance of the capacitors C1 and C3, and becomes VSS–VN'+VS'.

Here, the voltage VS' is expressed by the following equation (2), similarly to the voltage VN'.

$$VS'=C1 \times VS/(C1+C3) \tag{2}$$

Therefore, the final voltage, VC3, across the capacitor C3 is, $$VC3=VSS-C1 \times (VN-VS)/(C1+C3) \tag{3}$$

Thus, a high S/N signal, from which irregularity in the thresholds Vth of a MOS FET for resetting and of a MOS amplifier is reduced, is obtained as seen in the second term, (VN–VS).

In improving the S/N ratio of a CMOS image sensor, while taking measures to reduce fixed pattern noise by providing an image sensing apparatus and method of driving the apparatus as described above, it is also necessary to increase the maximum allowable charge (Qsat) so as to improve the S/N ratio with regard to random noise which occurs when displaying a moving image.

In a solid-state image sensing apparatus having a photoelectric conversion element, a transfer switch, and a field effect transistor (FET) for amplification whose gate accumulates photo-charge from the photoelectric conversion element of each pixel, a capacitance of a capacitor C which is connected to the gate of the FET (corresponding to the capacitor Cp in the aforesaid example) affects the maximum charge capable of being transferred, namely, the maximum allowable charge Qsat, when transferring photo-charge generated by the photoelectric conversion element to the gate of the FET.

The reason for this is as follows. If the charge to be transferred is electrons, relationship Vg (gate voltage)>Vpd (voltage generated by photodiode) should hold for the charge to be transferred. However, since the drop of the gate voltage Vg when unit charge is transferred is inverse-proportional to the capacitance C, if the capacitance C is small, the drop the gate voltage Vg is large in response to a small transferred charge. When the FET is a MOS FET, then the gate capacitance of the MOS FET is also included in the capacitance C. Since the gate capacitance of the MOS FET changes in accordance with its operation state, the maximum allowable charge Qsat changes depending upon the operation state of the MOS FET when transferring charge.

The aforesaid problem is not considered in the conventional operating method. In the conventional operating method as shown in FIG. 19, for instance, when transferring charge by applying a pulse $\Phi$VG to the gate of the MOS switch Q1, the source of the MOS amplifier Q2 connecting to the vertical signal line VL3 is in a floating state, therefore, the operation of the MOS amplifier Q2 is not determined. If the MOS amplifier Q2 is in an on state, since the MOS selector Q3 is also on when transferring charge, the voltage VDD is applied to the drain of the MOS selector Q3, thus the MOS amplifier Q2 is put into the saturation region and the gate capacitance is reduced comparing to a case of operating in the triode (linear) region. Therefore, problems result from unsteadiness of a floating state when reading photo-charge from the photoelectric conversion element and change in a linear operation range of the MOS amplifier Q2.

Further, in order to increase sensitivity upon transferring photo-charge from the capacitor C3 to a common output line, the capacitor C3 needs to have capacitance of several pF. In addition, in order to increase sensitivity, when reading photo-charge from each pixel, which is determined by a part of the second term of equation (3), namely C1/(C1+C3), the capacitor C1 needs to have a capacitance of least several times larger than the capacitance of the capacitor C3. However, due to limitation on the chip size and manufacturing cost, satisfactory sensitivity can not always be obtained.

Furthermore, in the aforesaid method of reading photo-charge, when reading a noise signal, the output side of the capacitor C1 is reset to the voltage VSS, whereas, when reading a photo-charge signal, the output side of the capacitor C1 is in a floating state. In the floating state, for the photodiode D1, the capacitance of the capacitors C1 and C3 connected in parallel becomes the capacitance of the capacitor C1. Therefore, there is no problem if reading operation is performed by taking a sufficiently long time; however, if reading operation is performed in a short time, the initial potential of the vertical signal line when outputting a noise signal and the initial potential of the vertical signal line when outputting a photo-charge signal are different, which makes it difficult to reduce noise at high precision.

In addition, in the aforesaid method of reading signals, the voltage for resetting the vertical signal line VL3 must be sufficient to turn on the MOS amplifier Q2 for every signal level inputted to the gate of the MOS amplifier Q2, thus restricts the reset voltage.

Besides the aforesaid reference, the concept of resetting the vertical signal line VL3 is disclosed in, e.g., the Japanese Patent Application Laid-Open No. 58-48577 and the Japanese Patent Publication No. 5-18309 for preventing interference between pixels, such as leakage of charge, in a photoelectric conversion element having non-destructive reading characteristics.

Operation of the aforesaid references is briefly explained with reference to the block diagram in FIG. 20 showing a sensor area of a solid-state image sensing apparatus disclosed in the foregoing references, a circuit diagram in FIG. 21 showing a horizontal switch circuit, and a timing chart in FIG. 22.

At time $t_{0p}$, a signal $\Phi P_{V1}$ becomes high, and MOS switches $S^1_1$ to $S^{768}_1$ which are connected to a vertical signal line V1 of a sensor array $C^j_i$ are turned on, thereby photo-charges in cells (pixels) $C^1_1$ to $C^{768}_1$, are outputted to signal output lines B1 to B768.

Slightly after the time $t_{0p}$, at time $t_{1p}$, a signal $\Phi P_{H1}$ applied to the horizontal signal line H1 becomes high. Accordingly, MOS switches $Q^1_1$ to $Q^1_{32}$ in a horizontal switch circuit are turned on, thereby photo-charge on the left-most signal output line in each of the 32 sub-groups, each includes 24 signal output lines, of the signal output lines B1 to B768 is outputted to multiplexing output lines A1 to A32. Signals on the multiplexing output lines A1 to A32 are outputted through amplifiers T1 to T32, respectively. Each of the amplifiers T1 to T32 comprises a pair of differential transistors both connected between a common constant current source and ground. To the base of one of the transistors, an analog pixel (photo-charge) signal is inputted, whereas to the base of the other transistor, a dark voltage from a pixel which is shielded from light is inputted. Then an analog signal obtained by subtracting the dark voltage from the analog pixel signal is outputted.

Then, the signal $\Phi P_{H1}$ applied to the horizontal signal line H1 becomes low, and a signal $\Phi P_{H2}$ on a horizontal signal line H2 becomes high at time $t_{2p}$. Accordingly, the MOS switches $Q^2_2$, to $Q^2_{32}$ in a horizontal switch circuit are turned on, thereby pixel signals on signal output lines which are the second to the left-most lines in the respective 32 sub-groups of signal output lines B1 to B768 are outputted to multiplexing output lines A1 to A32. Similarly, signals to be applied to the horizontal signal lines H3 to H24 sequentially become high, and analog pixel signals of the respective sub-groups are outputted. After the signal $\Phi P_{H24}$ applied to the last horizontal signal line H24 becomes low, the signal $\Phi P_{V1}$ applied to the vertical signal line V1 becomes low, thereby scanning of all the cells connected to the signal line V1 is completed.

Thereafter, before start of reading the cells connected to the signal line V3, a blanking period elapses. During the blanking period, signals $\Phi P_{H1}$ to $\Phi P_{H24}$ applied to the horizontal signal lines H1 to H24 are turned to high, thereby connecting all the signal output lines B1 to B768 to the corresponding output lines A1 to A32. At the same time, a signal $\Phi P_R$ on a refresh line R is turned to high and MOS switches R1 to R32 are turned on, thereby the multiplexing output lines A1 to A32 are grounded. Accordingly, all the signal output lines B1 to B768 are grounded, and residues of pixel signals remaining from the previous scanning are cleared.

However, there are the following problems in the aforesaid configuration, which will be explained below with reference to FIG. 23. FIG. 23 shows a case of reading pixel signals from the cells connected to the vertical signal line V1. In FIG. 23, a signal voltage of the cell $C^1{}_1$ is denoted by VS1, similarly, signal voltages of the cells $C^2{}_1$ to $C^{24}{}_1$ are denoted by VS2 to VS24, respectively. Further, parasitic capacitance of the signal output lines B1 to B24 is denoted by C11, parasitic capacitance connected to the base of the transistor connected to the differential transistor T1 is denoted by C21, the common signal output line is A1, and a signal voltage inputted to the base of the transistor is denoted by VSO. Then, a signal voltage VSO' when a signal on the signal output line B1 is read out is expressed by the following equation (4).

$$VSO'=(C21\times VSO+C11\times VS1)/(C21+C11) \qquad (4)$$

Further, a signal voltage VSO" when a signal on the signal output line B2 is read out is expressed by the following equation (5).

$$VSO''=(C21\times VSO'+C11\times VS2)/(C21+C11) \qquad (5)$$

In order to prevent interference between adjoining pixels by resetting the gate of the MOS switch R1 by applying the reset pulse $\Phi P_R$ only during the blanking period, it is necessary to reduce C21×VSO' in equation (5) by making the capacitance of the capacitor C11 much larger than the capacitance of the capacitor C21. However, when the capacitance of the capacitor C11 is increased, the capacitance upon transferring a signal from a cell also increases, thereby sensitivity decreases.

SUMMARY OF THE INVENTION

The present invention has been made in consideration of the above situation, and has as its object to improve the S/N ratio and widen the dynamic range of image signals obtained from a solid-state image sensing apparatus.

According to the present invention, the foregoing object is attained by providing a method of operating a solid-state image sensing apparatus having pixels each including a photoelectric conversion element, a field effect transistor whose gate receives photo-charge generated by the photoelectric conversion element, and a transfer switch for controlling connection between the photoelectric conversion element and the gate of the field effect transistor, wherein transference of the photo-charge from the photoelectric conversion element to the gate of the field effect transistor is performed under a condition that a channel is formed under the gate of the field effect transistor.

Further, the foregoing object is also attained by providing a method of operating a solid-state image sensing apparatus having pixels each including a photoelectric conversion element, a field effect transistor whose gate receives photo-charge generated by the photoelectric conversion element, a first switch for controlling connection between the photoelectric conversion element and the gate of the field effect transistor, and a first reset means for resetting the gate of the field effect transistor, and output lines for transferring an output from the field effect transistors, load means, provided on the output lines, for the field effect transistors, and second reset means for resetting the output lines to a predetermined voltage, wherein the output lines are reset by the second reset means in advance of connecting of the photoelectric conversion element and the gate of the field effect transistor.

Further, the foregoing object is also attained by providing a solid-state image sensing apparatus having pixels each including a photoelectric conversion element, a field effect transistor whose gate receives photo-charge generated by the photoelectric conversion element, and a transfer switch for controlling connection between the photoelectric conversion element and the gate of the field effect transistor, comprising control means for controlling that transference of the photo-charge from the photoelectric conversion element to the gate of the field effect transistor is performed under a condition that a channel is formed under the gate of the field effect transistor.

Further, the foregoing object is also attained by providing a solid-state image sensing apparatus having pixels each including a photoelectric conversion element, a field effect transistor whose gate receives photo-charge generated by the photoelectric conversion element, a first switch for controlling connection between the photoelectric conversion element and the gate of the field effect transistor, and a first reset means for resetting the gate of the field effect transistor, and output lines for transferring an output from the field effect transistors, comprising load means, provided on the output lines, for the field effect transistors; and second reset means for resetting the output lines to a predetermined voltage.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

DETAILED DESCRIPTION OF THE PREFERRED EMBODIMENTS

Preferred embodiments of the present invention will be described in detail below in accordance with the accompanying drawings.

First Embodiment

Figure 1:
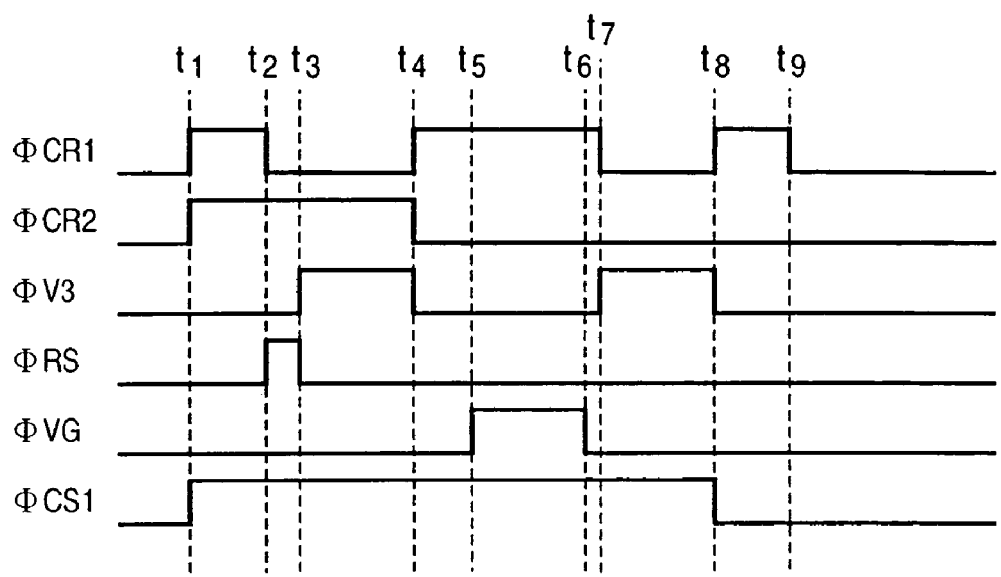
FIG. 1 is a timing chart showing operation timing according to a first embodiment of the present invention.
Figure 18:
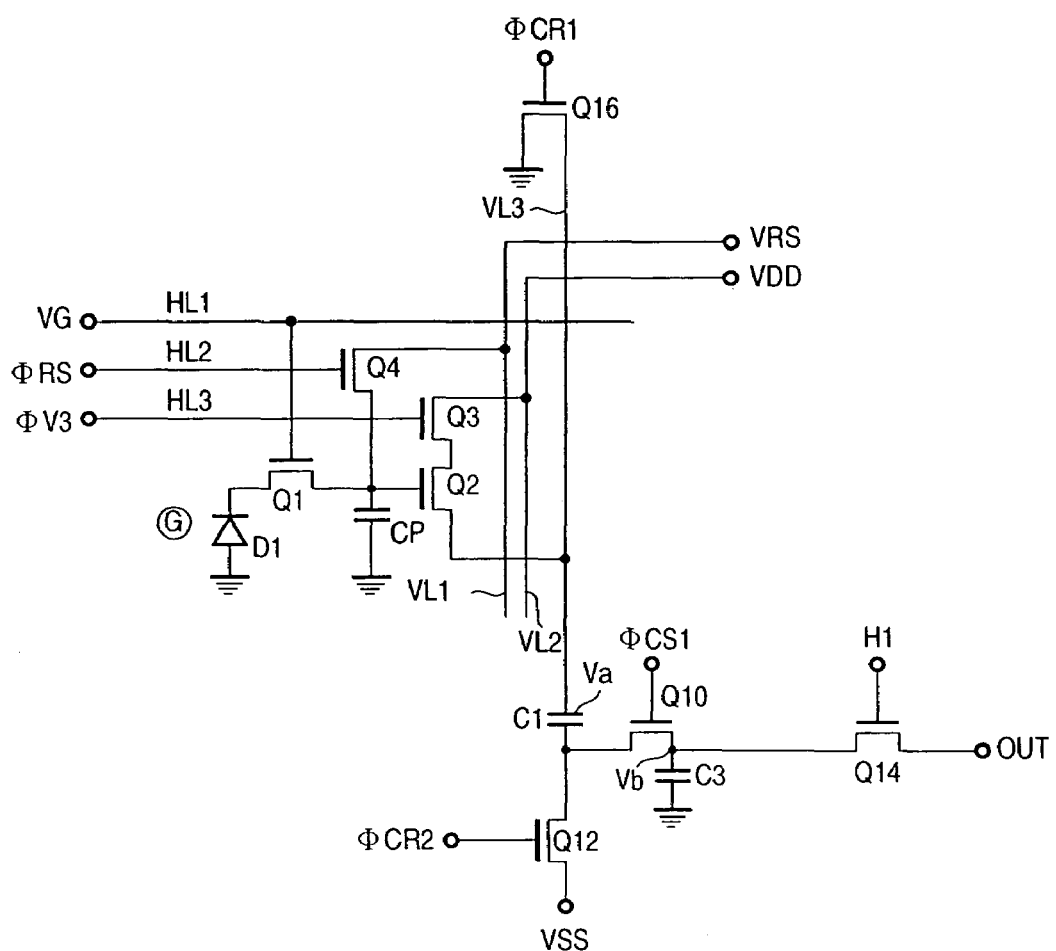
FIG. 18 is a circuit diagram corresponding to a single pixel of the conventional solid-state image sensing apparatus shown in FIG. 17.

As the first embodiment, a case where the solid-state image sensing apparatus as shown in FIG. 18 is driven at timing as shown in a timing chart in FIG. 1 is explained. The solid-state image sensing apparatus provides photo-charge, generated by the photodiode D1 in accordance with the quantity of light, to the MOS amplifier Q2 via the MOS switch Q1, then turns on the MOS selector Q3 to transfer the photo-charge to a vertical signal line VL3.

In advance of reading of the photo-charge from a photo-diode D1, the signals $\Phi CR1$, $\Phi CR2$ and $\Phi CS1$ at time $t_1$ are changed to high, thereby a MOS switch Q16 is turned on; in turn, the vertical signal line VL3 becomes a ground level, and the capacitors C1 and C3 are reset to the voltage VSS. Thereafter, the signal $\Phi CR1$ is changed to a low level at time $t_2$, further, the reset signal $\Phi RS$ is changed to a high level, thereby the gate of the MOS amplifier Q2 is reset to the voltage VRS.

Then, at time $t_3$, the reset signal $\Phi RS$ is changed to a low level and the signal $\Phi V3$ is changed to high, thereby the MOS selector Q3 is turned on, and the operation voltage VDD is provided to the drain of the MOS amplifier Q2.

Accordingly, a voltage VN corresponding to the gate voltage of the MOS amplifier Q2 appears on the vertical signal line VL3 (noise signal).

Next, the signal $\Phi CR2$ is changed to low at time $t_4$, which puts the output side of the capacitor C1 and one electrode of the capacitor C3 in a floating state. At this time, the signal $\Phi V3$ is changed to low to turn the MOS selector Q3 off. Then, the signal $\Phi CR1$ is changed to high to reset the vertical signal line VL3, thereby the potential of the output side of the capacitor C1 and one electrode of the capacitor C3 becomes a potential, VSS–VN', that is, the bias voltage VSS is reduced by a voltage VN', which is a part of the voltage VN, corresponding to the ratio of the capacitance of the capacitor C1 to the total capacitance of the capacitors C1 and C3.

Next at time $t_5$, the signal $\Phi VG$ applied to the gate of the MOS switch Q1 is changed to high, and photo-charge is transferred from the photodiode D1 to the gate of the MOS amplifier Q2. At this time, the signal $\Phi CR1$ is kept high to fix the source of the MOS amplifier Q2 to a ground level, and the signal $\Phi V3$ is set to low to cut the supply of the voltage VDD to the drain of the MOS amplifier Q2, thereby it is possible to restrain the operational range of the MOS amplifier Q2 to the triode region. More specifically, during a period between time $t_4$, when the signal $\Phi V3$ is set to low, and the time $t_5$, when the signal $\Phi VG$ is set to high, a potential at the drain of the MOS amplifier Q2 decreases to near the ground level, thereby a bias relationship between the gate and the drain of the MOS amplifier Q2, namely a potential difference between the gate and the drain of the MOS amplifier Q2 is greater than a threshold, is maintained.

To the gate of the MOS amplifier Q2 whose operational range is limited to the triode region, a capacitance of oxide film, having a large area determined by the gate width and the gate length, is added. Accordingly, the maximum allowable charge increases.

Thereafter, the signal $\Phi VG$ is changed to low at time $t_6$, then, the signal $\Phi CR1$ is changed to low and the signal $\Phi V3$ is changed to high at time $t_7$, a voltage VS corresponding to the photo-charge transferred to the gate of the MOS amplifier Q2 appears on the vertical signal line VL3 (photo-charge signal). Accordingly, the potential at the output side of the capacitor C1 and one electrode of the capacitor C3 becomes (VSS–VN'+VS').

Figure 19:
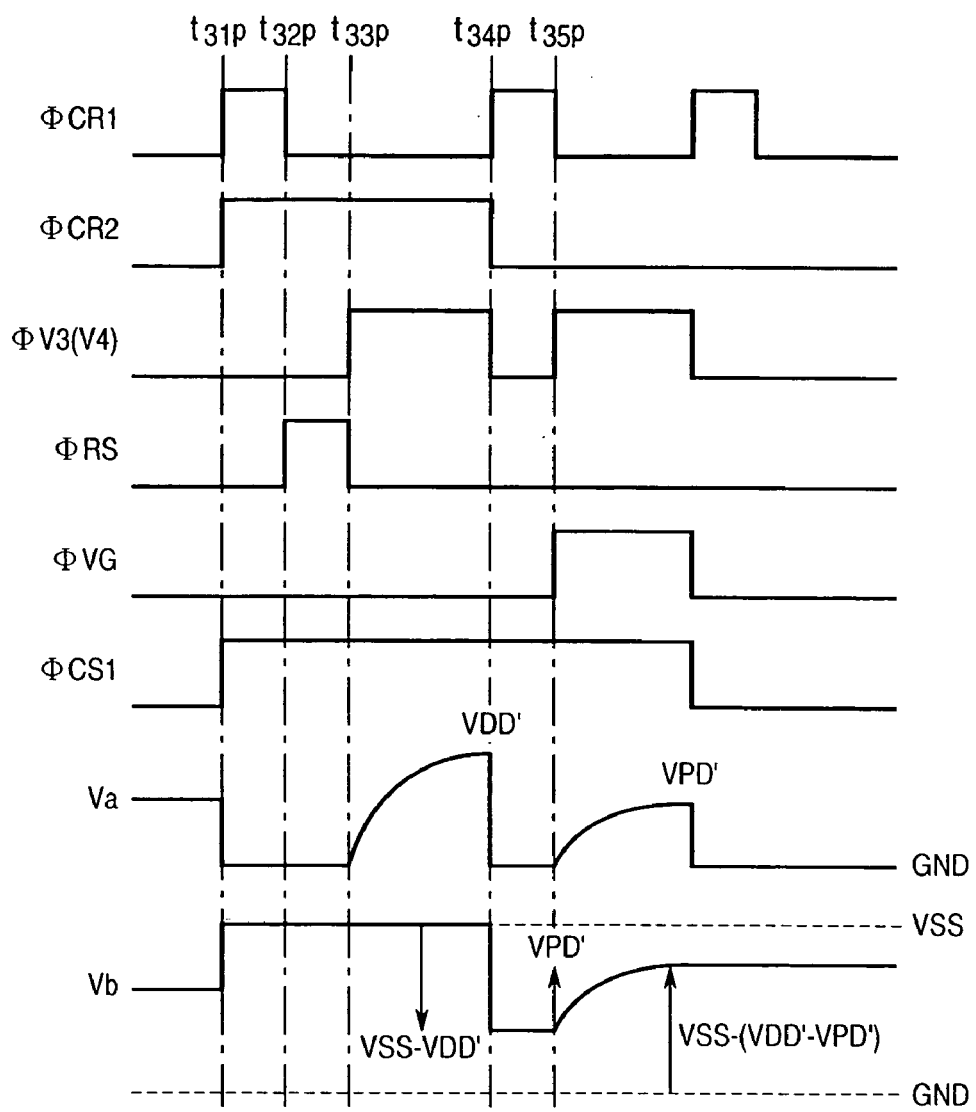
FIG. 19 is a timing chart for explaining an operation of the conventional solid-state image sensing apparatus.
Figure 20:
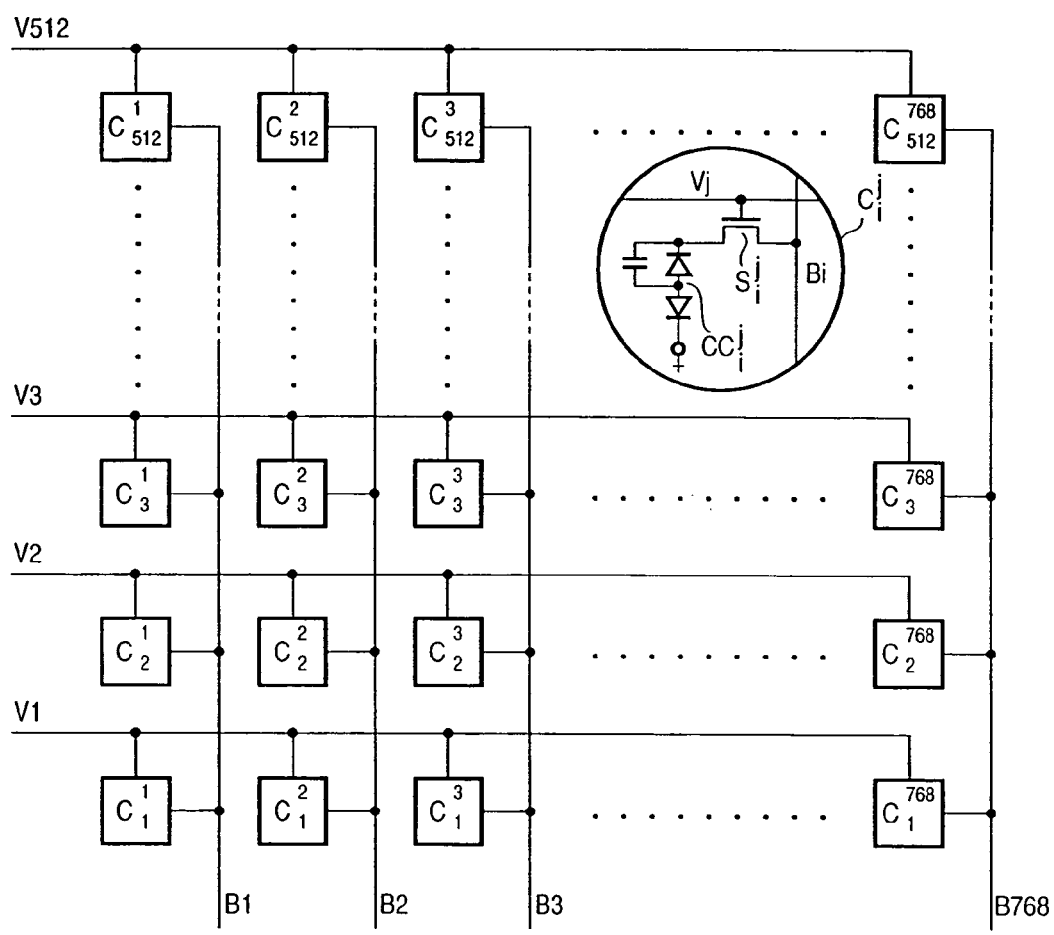
FIG. 20 is a diagram of a sensor area of another conventional solid-state image sensing apparatus.
Figure 21:
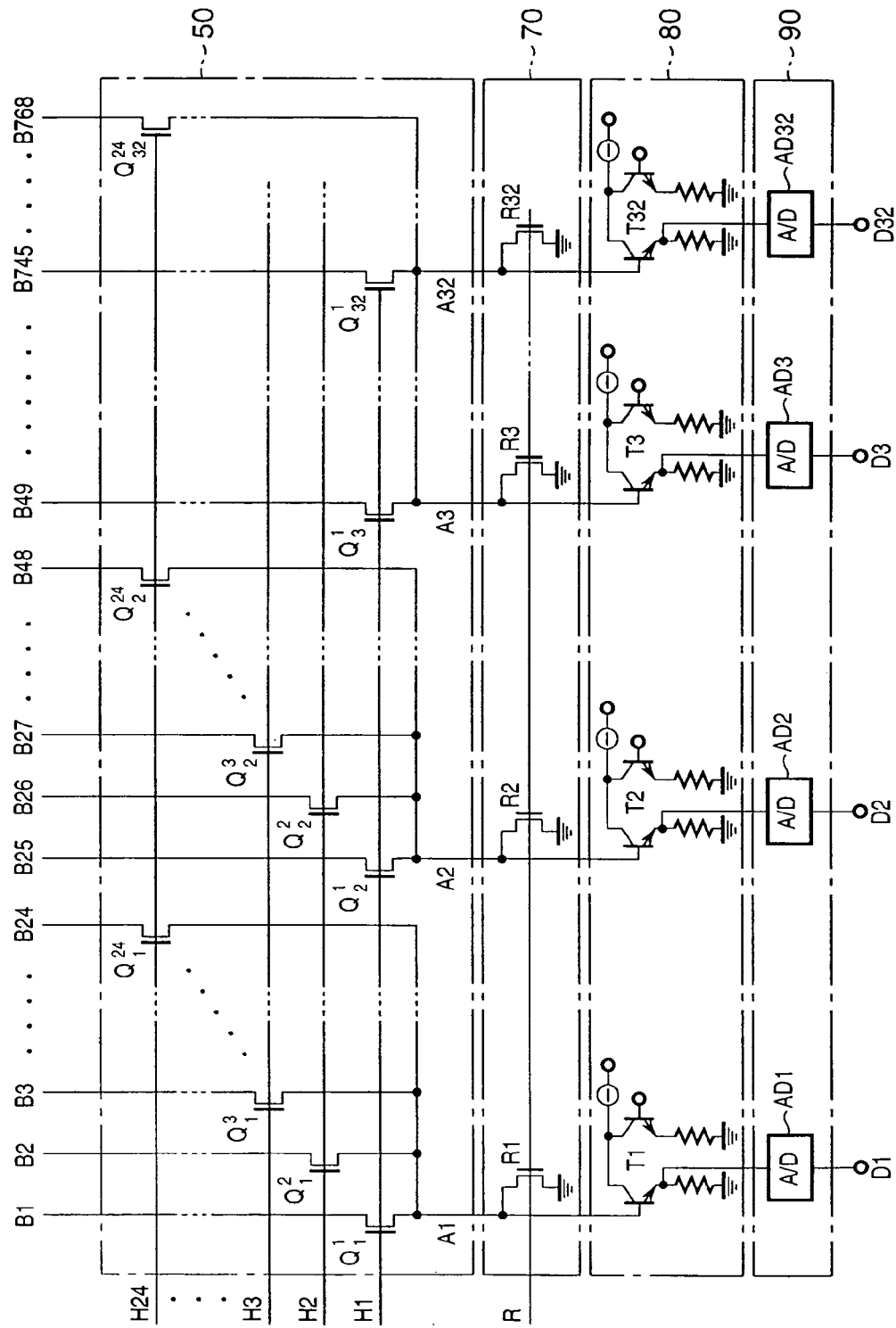
FIG. 21 is a circuit diagram of a horizontal switch circuit of the conventional solid-state image sensing apparatus.
Figure 22:
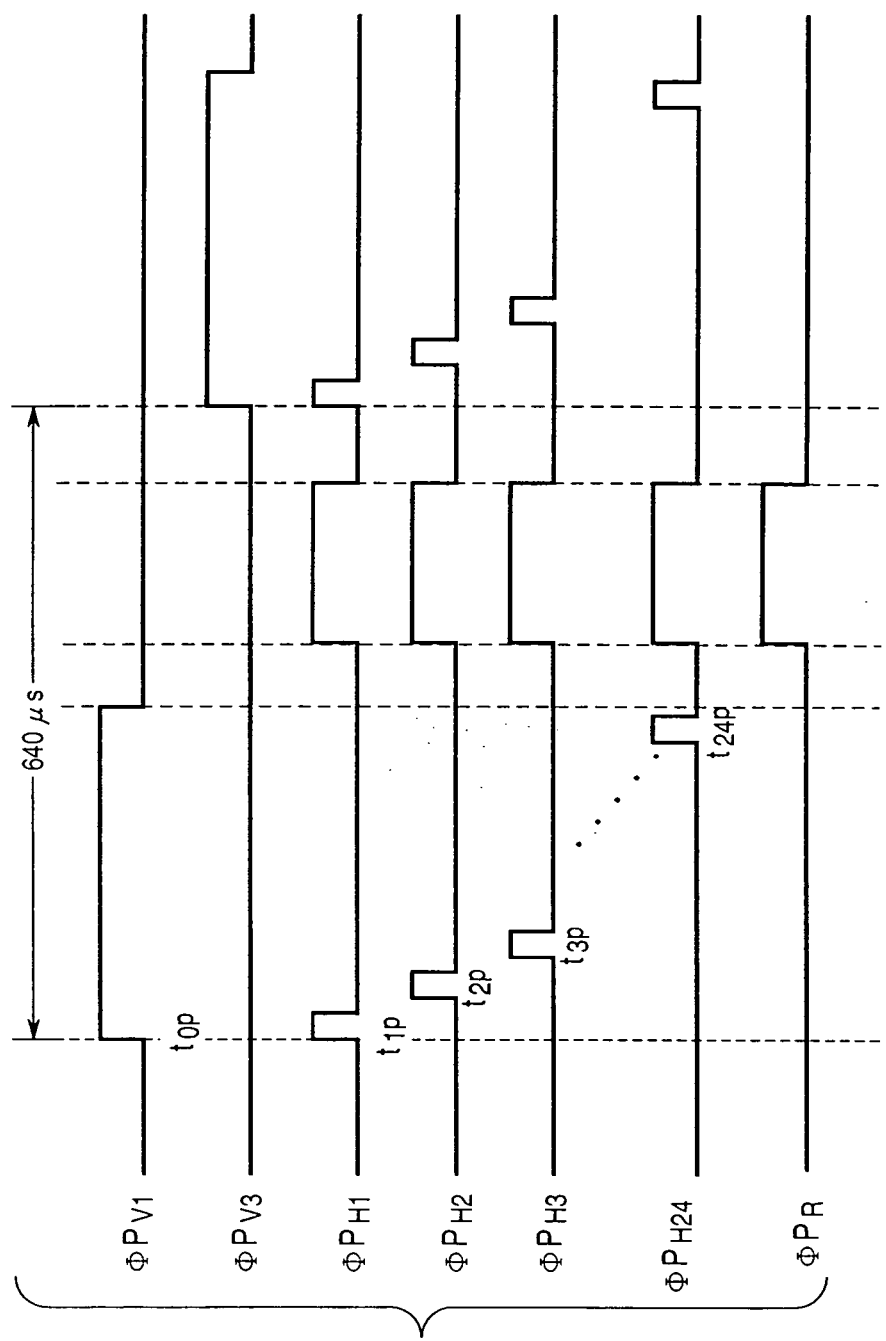
FIG. 22 is a timing chart for explaining an operation of the conventional solid-state image sensing apparatus.
Figure 23:
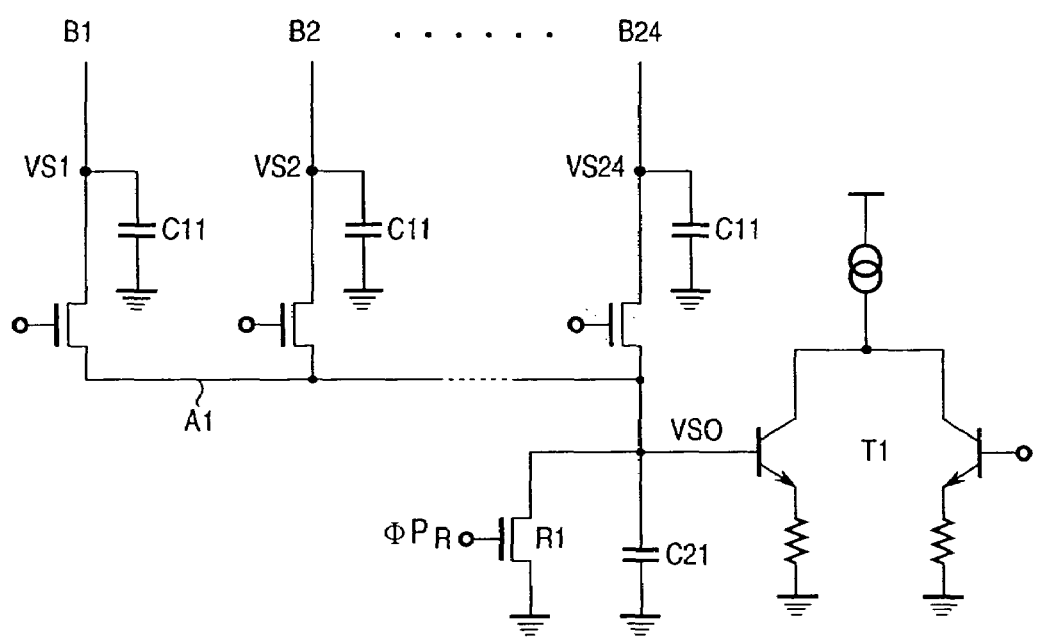
FIG. 23 is an explanatory view for explaining a problem of the conventional solid-state image sensing apparatus.

Comparing to the operation method as described with reference to FIG. 19, charge which can be dealt with in the linear operation region (i.e., maximum allowable charge) is increased since the gate capacitance of the MOS amplifier, while transferring the charge, is increased, and the maximum allowable charge is increased by 15%, although there is no difference in the noise removal rate of fixed pattern noise between the conventional method and the method of the present invention.

In the operation method according to the first embodiment, transference of a photo-charge signal from a photo-diode of a photoelectric conversion element to the gate of a field effect transistor (FET) which functions as an amplifier is performed under a condition that the channel is formed under the gate of the FET by the reset voltage VRS, and the gate voltage is lowered by the transferred charge. Accordingly, a voltage corresponding to the lowered gate voltage appears on a vertical signal line.

In other words, while transferring the photo-charge signal from a photodiode of a photoelectric conversion element to the gate of a field effect transistor which functions as an amplifier, the gate voltage of the FET is higher than the sum of the source voltage and the threshold voltage of the FET.

Second Embodiment

Figure 2:
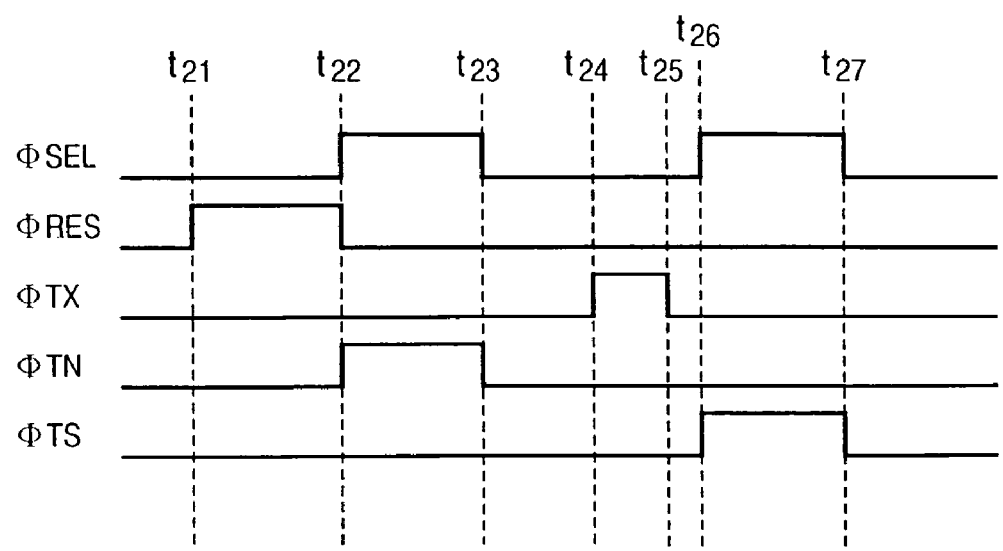
FIG. 2 is a timing chart showing operation timing according to a second embodiment of the present invention.
Figure 3:
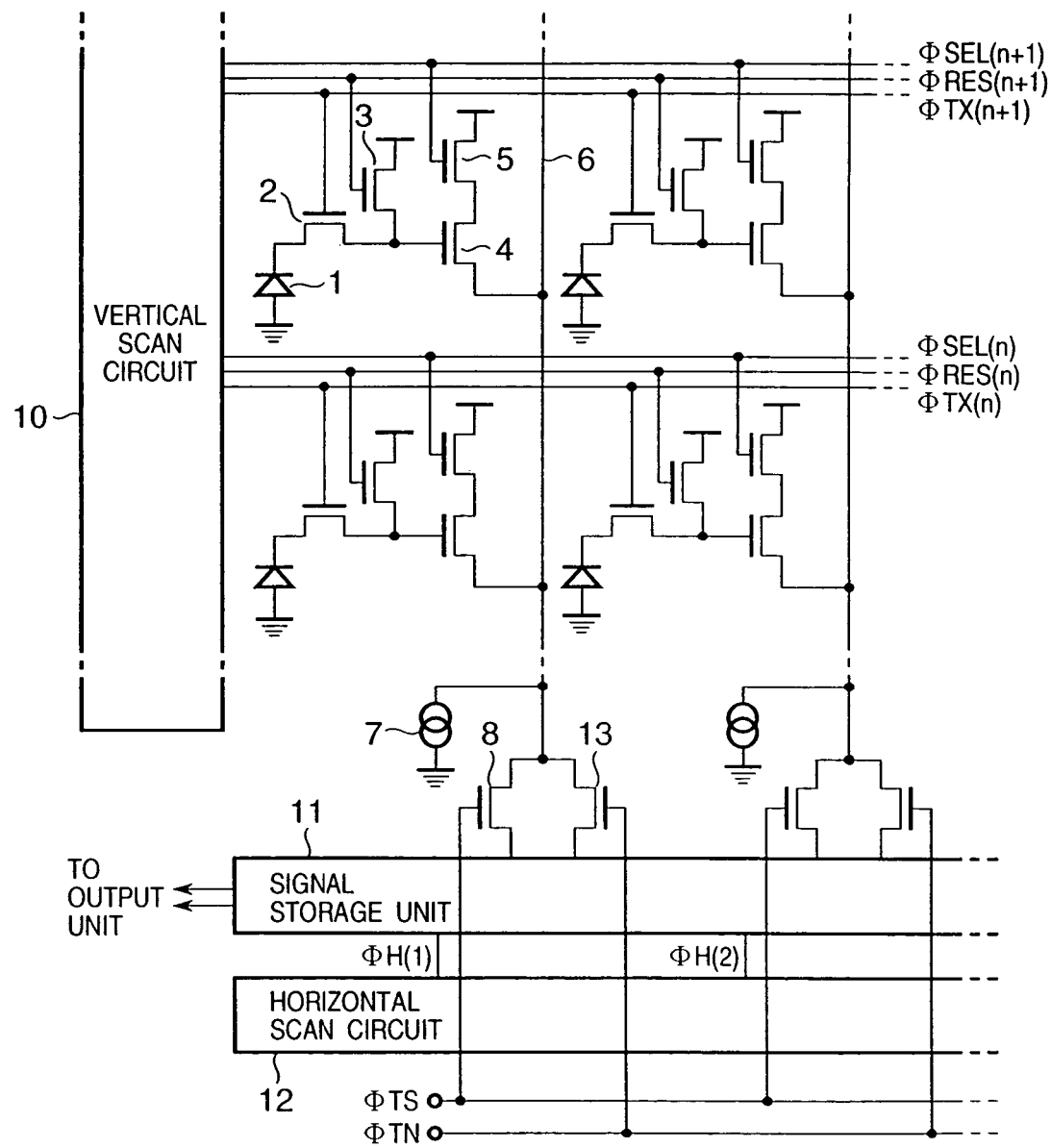
FIG. 3 is a circuit diagram of a part of a solid-state image sensing apparatus according to the second embodiment of the present invention.

Next, an example of operating a solid-state image sensing apparatus as shown in FIG. 3 in accordance with timing shown in FIG. 2 is explained in the second embodiment.

First, a circuit configuration of the solid-state image sensing apparatus as shown in FIG. 3 is explained. Each pixel includes a photodiode 1, a transfer switch 2, a reset switch 3, a pixel amplifier 4, and a row selection switch 5 and a plurality of such pixels are connected as shown in FIG. 3. Note, only four pixels are shown in FIG. 3, however, a number of pixels are arranged in practice. When the row selection switch 5 is turned on, a source follower, configured with a source of load current 7 and the pixel amplifier 4, starts operating, and signals of a selected row are transferred to respective vertical output lines 6. The signals are stored in signal storage unit 11 via respective transfer gates 8. The signals, temporarily stored in the signal storage unit 11, are sequentially transferred to an output unit (not shown) via a horizontal scan circuit 12.

Next, the case of operating the solid-state image sensing apparatus as shown in FIG. 3 in accordance with operation timing shown in FIG. 2 is explained below. First, a signal ΦRES becomes high at $t_{21}$, then the gate of the pixel amplifier 4 is reset to a reset potential (potential of pulse ΦRES minus threshold potential). Thereafter, a signal ΦSEL becomes high at time $t_{22}$, and the source follower, configured with the pixel amplifier 4 and the source of load current 7, starts operating. Accordingly, noise corresponding to the reset potential appears on the corresponding vertical output line 6, and is temporarily stored in the signal storage unit 11 by changing a signal ΦTN to high as well as turning a transfer gate 13 on. After reading the noise signal, the signals ΦSEL and ΦTN are changed to low at time $t_{23}$, and the potential of the vertical output line 6 decreases as load current is supplied from the source of current 7. When the potential of the vertical output line 6 decreases to near ground voltage, a transfer signal ΦTX becomes high at time $t_{24}$, and photo-charge is transferred from each photodiode 1 to the gate of the pixel amplifier 4.

At this time, no voltage is provided to the drain of the pixel amplifier 4, thus, the pixel amplifier 4 operates in the triode region. Therefore, the gate capacitance of the pixel amplifier becomes the maximum. Thereafter, the signal ΦTX is changed to low at time $t_{251}$ then the signals ΦSEL and ΦTS are changed to high at time $t_{26}$, and the photo-charge are read out.

By controlling a period between the time $t_{25}$ when the signal ΦTX is changed to low, and the time $t_{26}$ when the signals ΦSEL and ΦTS are changed to high, it is possible to operate the pixel amplifier 4 in a linear operation region, thereby a photo-charge signal is obtained in a wide dynamic range.

When photo-charge is transferred from the photodiode 1 to the pixel amplifier 4 according to the second embodiment, since the operation of the pixel amplifier 4 is limited to the triode region, the maximum allowable charge is increased by 11% comparing to the conventional operation method.

Third Embodiment

Figure 4:
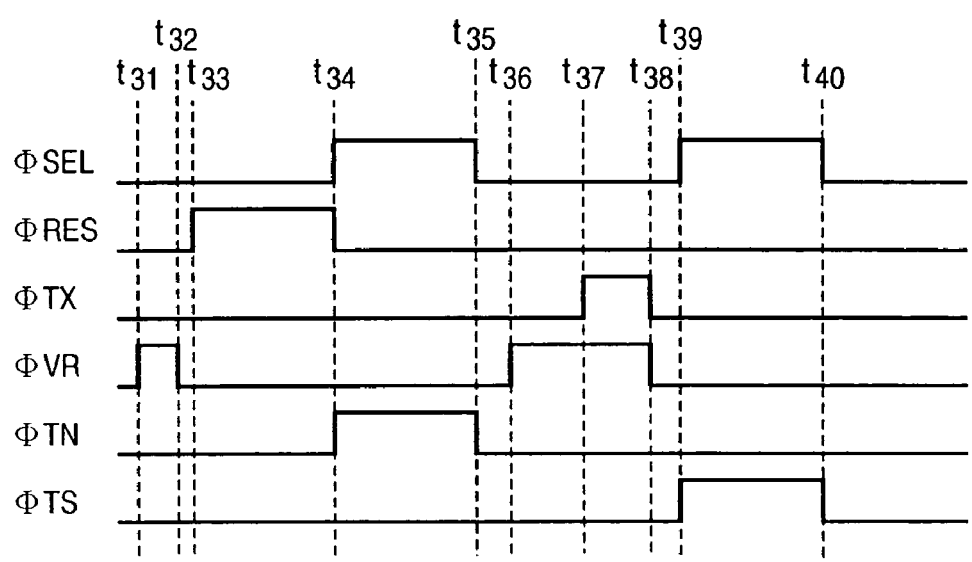
FIG. 4 is a timing chart showing operation timing according to a third embodiment of the present invention.
Figure 5:
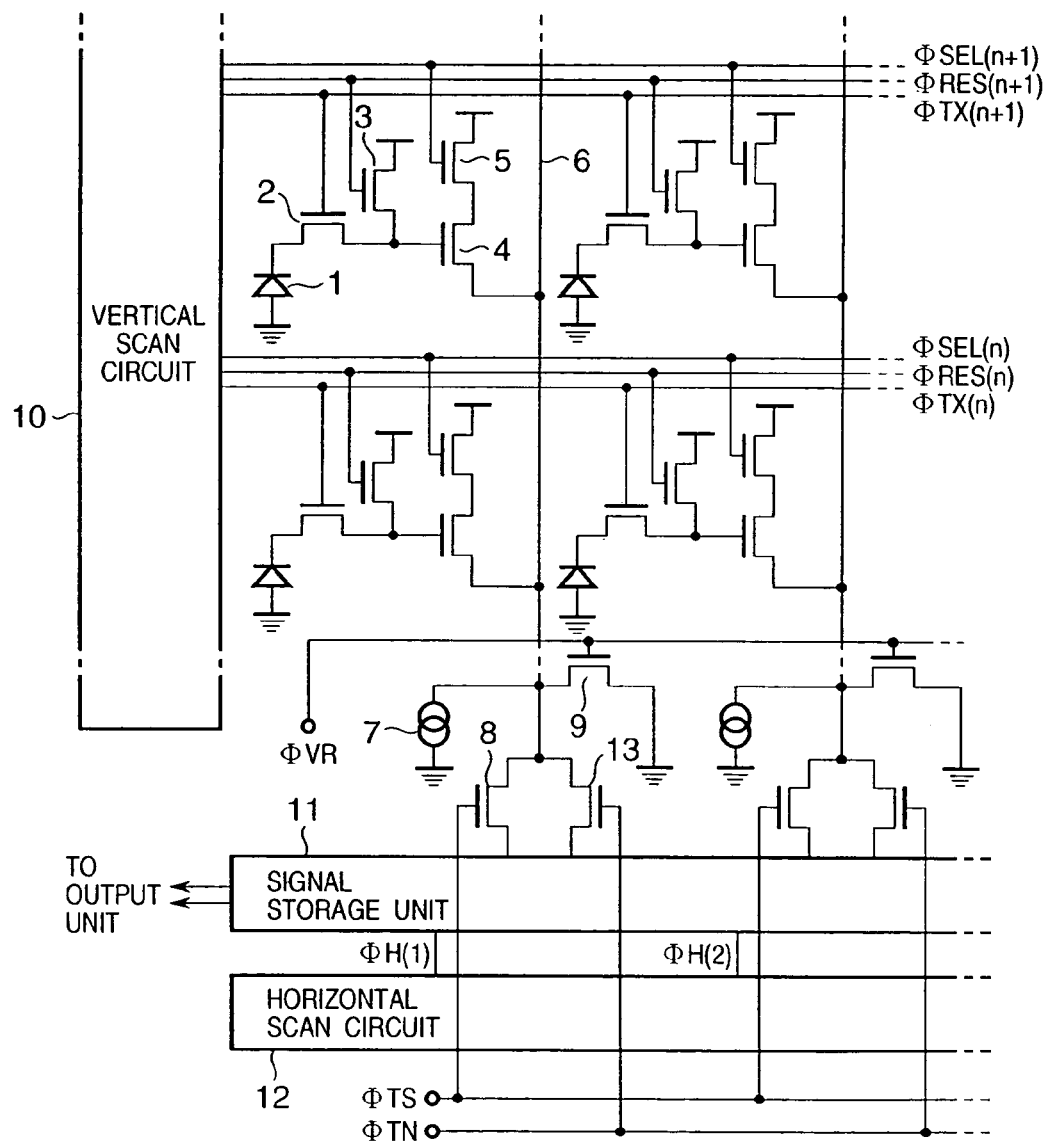
FIG. 5 is a circuit diagram of a part of a solid-state image sensing apparatus according to the third embodiment of the present invention.

Next, an example of operating a solid-state image sensing apparatus as shown in FIG. 5 in accordance with timing shown in FIG. 4 is explained in the third embodiment.

First, a circuit configuration of the solid-state image sensing apparatus as shown in FIG. 5 is explained. Each pixel includes a photodiode 1, a transfer switch 2, a reset switch 3, a pixel amplifier 4, and a row selection switch 5 and a plurality of such pixels are connected as shown in FIG. 5. Note, only four pixels are shown in FIG. 5, however, a number of pixels are arranged in practice. When the row selection switch 5 is turned on, a source follower, configured with a source of load current 7 and the pixel amplifier 4, starts operating, and signals of a selected row are transferred to respective vertical output lines 6. The signals are stored in signal storage unit 11 via respective transfer gates 8. The signals, temporarily stored in the signal storage unit 11, are sequentially transferred to an output unit (not shown) via a horizontal scan circuit 12. Further, vertical-output-line reset switches 9 for resetting the vertical output lines 6 to a fixed potential are also provided. Differences between FIG. 5 and FIG. 3 are that the vertical-output-line reset switches 9 are provided and a reset pulse ΦVR is supplied to the gate of the reset switches 9 in FIG. 5.

Next, a case of operating the solid-state image sensing apparatus as shown in FIG. 5 in accordance with operation timing shown in FIG. 4 is explained below. First, the signal ΦVR becomes high at $t_{31}$, and the vertical output lines 6 are reset to a fixed potential (ground potential in the third embodiment). After the signal ΦVR is changed to low at time $t_{32}$ a signal ΦRES becomes high at $t_{33}$, then the gate of the pixel amplifier 4 is reset to a reset potential. Thereafter, the signal ΦRES is changed to low, and signals ΦSEL and ΦTN become high at time $t_{34}$. Accordingly, the source follower, configured with the pixel amplifier 4 and the source of load current 7, starts operating, and noise corresponding to the reset potential appears on the corresponding vertical output line 6, and is temporarily stored in the signal storage unit 11 by turning on the transfer gate 13.

After reading the noise signal at time $t_{35}$, the signal ΦVR becomes high at time $t_{36}$, and the vertical output lines 6 are again reset to the ground potential. During a period when the vertical output lines 6 are reset, the transfer signal ΦTX becomes high at time $t_{37}$, in turn, photo-charge is transferred from the photodiode 1 to the gate of the pixel amplifier 4. At this time, the source of the pixel amplifier (MOS FET) 4 is fixed to the ground potential to which the vertical output lines 6 are reset. Further, since the drain of the pixel amplifier 4 is not supplied with a voltage, the operation of the pixel amplifier 4 is limited to the triode region.

After photo-charge is transferred to the gate of the pixel amplifier 4 at time $t_{38}$, the signals ΦSEL and ΦTS are changed to high at time $t_{39}$, and the photo-charge is transferred to the corresponding vertical output line 6, further, read out to the signal storage unit 11 by turning on the transfer gate 8. In the second embodiment, it is necessary to supply sufficiently large current from the source of current 7 for decreasing the potential at the source of the pixel amplifier 4 to near the ground potential when transferring charge, or to lengthen a blank period after noise is read out until photo-charge is transferred. In the third embodiment, in contrast, the vertical output lines 6 can be reset, therefore, there is no such limitation as described above associated with the configuration of the photoelectric conversion element as described in the second embodiment.

Further, if the potential of the vertical output line 6 changes while the gate potential of the pixel amplifier 4 is in the floating state, a feed-back phenomenon is caused by gate-source capacitance of the pixel amplifier 4. In the third embodiment, the potential of the vertical output line 6 always increases from the ground potential, the ratio of the feed-back voltage to the voltage of the photo-charge is kept constant, and the photo-charge output is kept linear as an additional effect.

Comparing to the conventional operation method, the maximum allowable charge Qsat is increased by 13% according to the third embodiment, since the gate capacitance of the pixel amplifier 4 is maximum when transferring photo-charge to the gate of the pixel amplifier 4.

Fourth Embodiment

Figure 6:
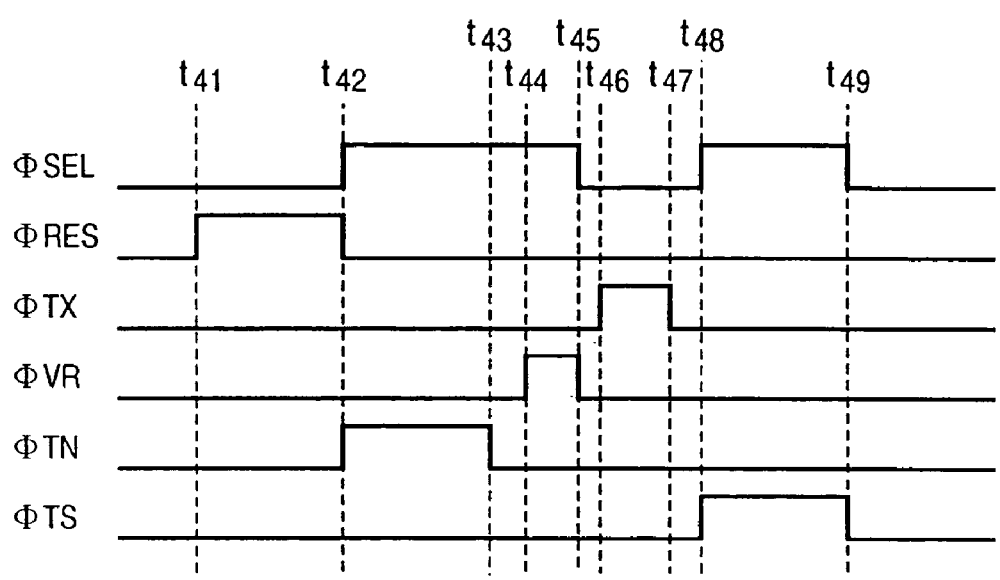
FIG. 6 is a timing chart showing operation timing according to a fourth embodiment of the present invention.
Figure 7:
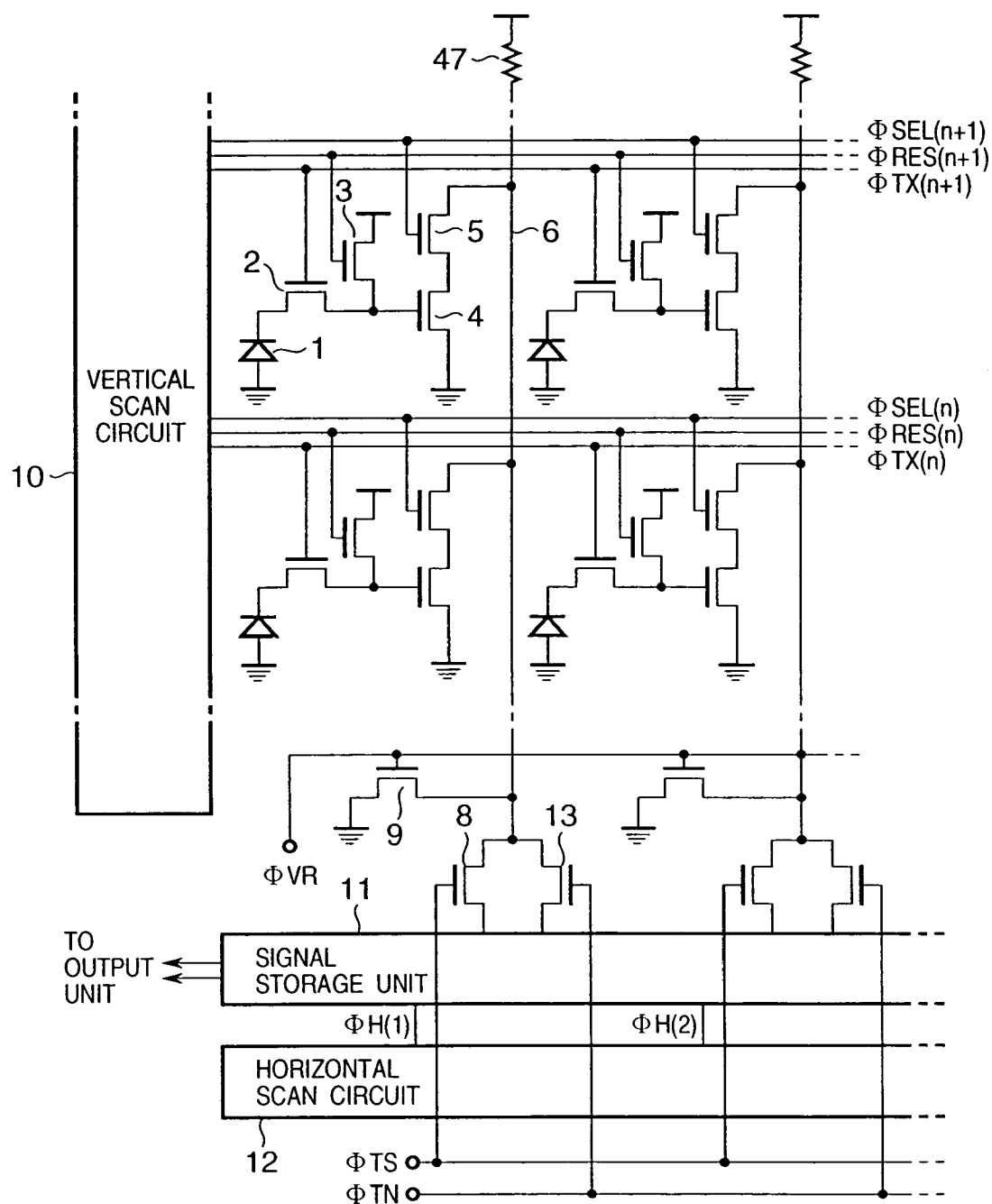
FIG. 7 is a circuit diagram of a part of a solid-state image sensing apparatus according to the fourth embodiment of the present invention.

Next, an example of operating a solid-state image sensing apparatus as shown in FIG. 7 in accordance with timing shown in FIG. 6 is explained in the fourth embodiment.

First, the circuit configuration of the solid-state image sensing apparatus as shown in FIG. 7 is explained. Each pixel includes a photodiode 1, a transfer switch 2, a reset switch 3, a pixel amplifier 4, and a row selection switch 5 and a plurality of such pixels are connected as shown in FIG. 7. Note, only four pixels are shown in FIG. 7, however, a number of pixels are arranged in practice. The pixel amplifier 4 is connected to a corresponding vertical output line 6 via the row selection switch 5, and when the pixel amplifier 4 and the row selection switch 5 are turned on the pixel amplifier 4, with a resistor 47, operates as an inverse amplifier. Further, vertical-output-line reset switches 9 for resetting the vertical output lines 6 to a fixed potential (ground potential in the fourth embodiment) are also provided. The pixel amplifier 4 in FIG. 7 differs from the pixel amplifier 4 in FIG. 5 in that it operates as an inverse amplifier with the resistor 47.

Next, a case of operating the solid-state image sensing apparatus as shown in FIG. 7 in accordance with operation timing shown in FIG. 6 is explained below. First, a signal ΦRES becomes high at $t_{41}$, then the gate of the pixel amplifier 4 is reset to a reset potential. Thereafter, signals ΦSEL and ΦTN become high at time $t_{42}$, the transfer gate 13 is turned on, and noise is read out. After reading the noise signal at time $t_{43}$, while keeping the signal ΦSEL high, a signal ΦVR is changed to high at time $t_{44}$, and the vertical output line 6 and the drain of the pixel amplifier 4 are reset to the ground potential. Then, the signals ΦSEL and ΦVR are changed to low at time $t_{45}$, accordingly, the drain of the pixel amplifier 4 is put into the floating state while maintaining the ground potential. At this time, the source of the pixel amplifier 4 is grounded, thus, the operation of the pixel amplifier 4 is limited to the triode region.

Under the foregoing state, a signal ΦTX becomes high at time $t_{46}$, and photo-charge is transferred from the photodiode 1 to the gate of the pixel amplifier 4. Subsequently, the signal ΦTX is changed to low at time $t_{47}$, the row selection signal ΦSEL and the signal ΦTS are changed to high at time $t_{48}$. Accordingly, the transfer gates 8 are turned on and the photo-charge signals are read out. Thereafter, the noise signals and the photo-charge signals stored in a signal storage unit 11 are sequentially outputted via a horizontal scan circuit 12 in accordance with a horizontal scan signal ΦH(1, 2).

In the fourth embodiment, the pixel amplifier 4 is in the triode state while transferring photo-charge to the gate of the pixel amplifier 4, and the maximum allowable charge Qsat is increased by 25% comparing to the conventional operation method.

Fifth Embodiment

Figure 8:
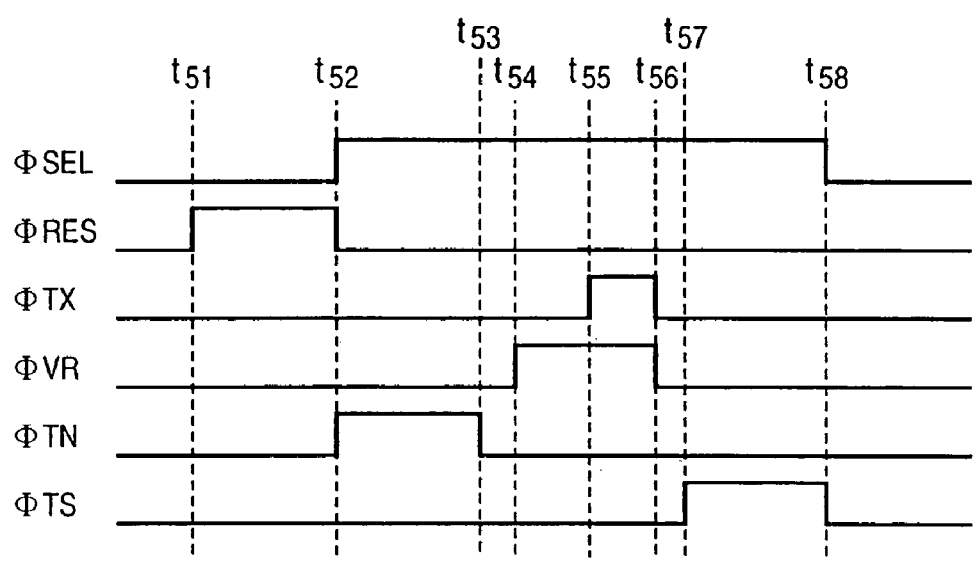
FIG. 8 is a timing chart showing operation timing according to a fifth embodiment of the present invention.
Figure 9:
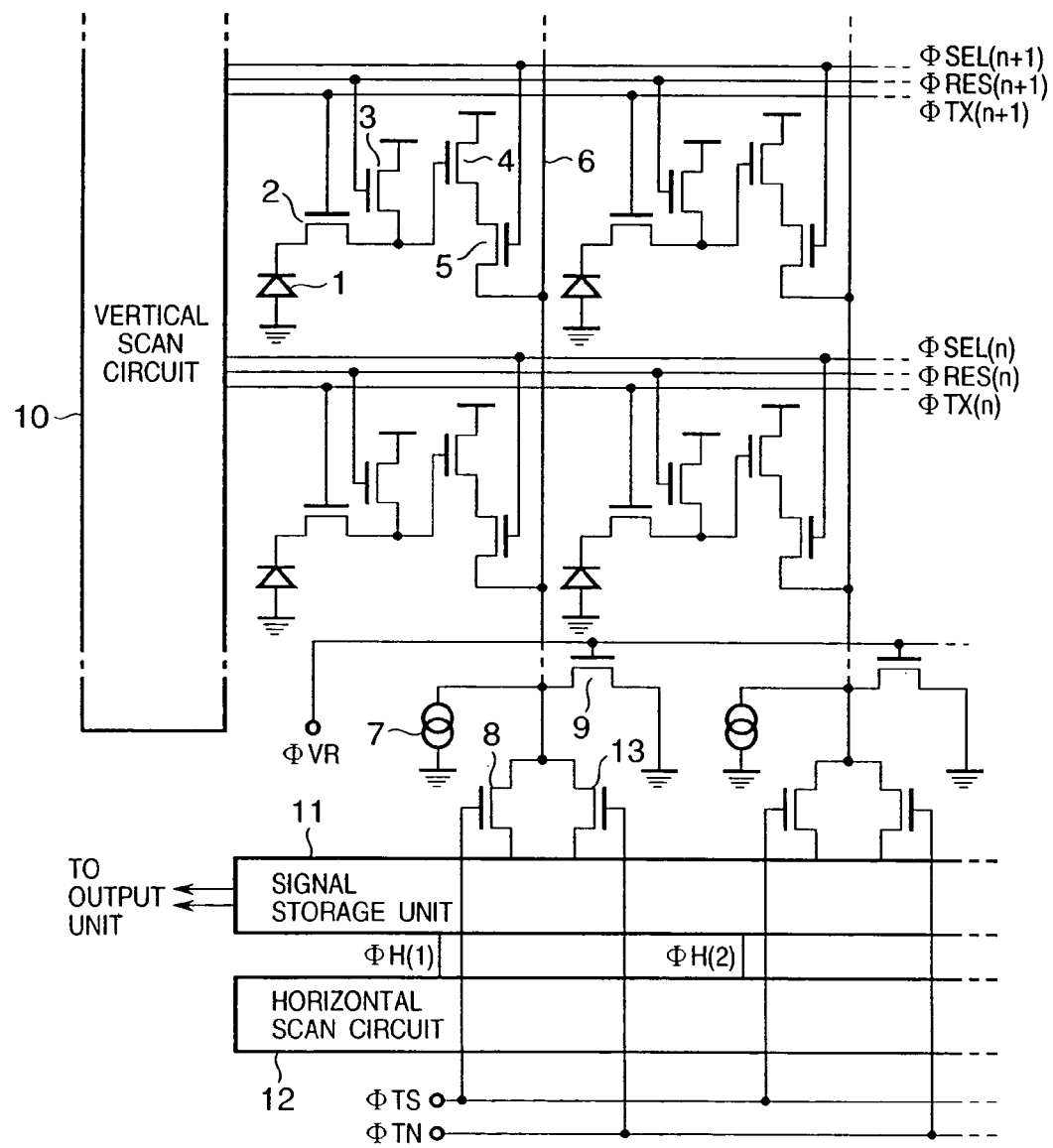
FIG. 9 is a circuit diagram of a part of a solid-state image sensing apparatus according to the fifth embodiment of the present invention.

Next, an example of operating a solid-state image sensing apparatus as shown in FIG. 9 in accordance with timing shown in FIG. 8 is explained in the fifth embodiment.

First, a circuit configuration of the solid-state image sensing apparatus as shown in FIG. 9 is explained. Each pixel includes a photodiode 1, a transfer switch 2, a reset switch 3, a pixel amplifier 4, and a row selection switch 5 and a plurality of such pixels are connected as shown in FIG. 9. Note, only four pixels are shown in FIG. 5, however, a number of pixels are arranged in practice. When the row selection switch 5 is turned on, a source follower, configured with a source of load current 7 and the pixel amplifier 4, starts operating, and signals of a selected row are transferred to respective vertical output lines 6. The signals are stored in signal storage unit 11 via respective transfer gates 8. The signals, temporarily stored in the signal storage unit 11, are sequentially transferred to an output unit (not shown) via a horizontal scan circuit 12. Further, vertical-output-line reset switches 9 for resetting the vertical output lines 6 to a fixed potential are also provided. Differences between FIG. 9 and FIG. 5 are that the row selection switch 5 is connected in the side of the source of the pixel amplifier 4, and a noise signal and a photo-charge signal are both read out to the corresponding vertical output line 6 via the row selection switch 5.

Next, the case of operating the solid-state image sensing apparatus as shown in FIG. 9 in accordance with operation timing shown in FIG. 8 is explained below. First, a signal ΦRES becomes high at $t_{51}$, then the gate of the pixel amplifier 4 is reset to a reset potential. Thereafter, signals ΦSEL and ΦTN become high at time $t_{52}$, and noise is read out to the signal storage unit 11. After reading the noise signal, the signal ΦTN is changed to low at time $t_{53}$ and a signal ΦVR is changed to high at time $t_{54}$, thereby the vertical output line 6 is reset. At this time, since the signal ΦSEL is kept high, the potential at the source of the pixel amplifier 4 is simultaneously reset and fixed to the ground potential. Under this state, the signal ΦTX becomes high at time $t_{55}$, and photo-charge is transferred from the photodiode 1 to the gate of the pixel amplifier 4. As the photo-charge is transferred, the gate potential of the pixel amplifier 4 decreases; however, since the source of the pixel amplifier 4 is fixed to the ground potential through the row selection switch 5, the pixel amplifier 4 is always in the on-state during transferring the photo-charge. After transferring the photo-charge, the signals ΦVR and ΦTX are changed to low at time $t_{56}$ and a signal ΦTS is changed to high at time $t_{57}$, thereby the photo-charge signal is read out to the signal storage unit 11. Thereafter, the signals ΦSEL and ΦTS are changed to low to finish reading operation of one row, and the process proceeds to operation of reading the next row.

In the fifth embodiment as described above, since the pixel amplifier 4 is always in the on-state while transferring photo-charge from the photodiode 1 to the gate of the pixel amplifier 4, the maximum allowable charge Qsat is increased by 43% comparing to the conventional operation method.

Note that, in the fifth embodiment, the solid-state image sensing apparatus has a vertical-output-line reset switches 9, however, they may be omitted if the sources of load current 7 supply sufficiently large current and the source of the pixel amplifiers 4 are quickly decreased to the ground potential before transferring photo-charges to the gate of the pixel amplifiers 4.

Sixth Embodiment

Figure 10:
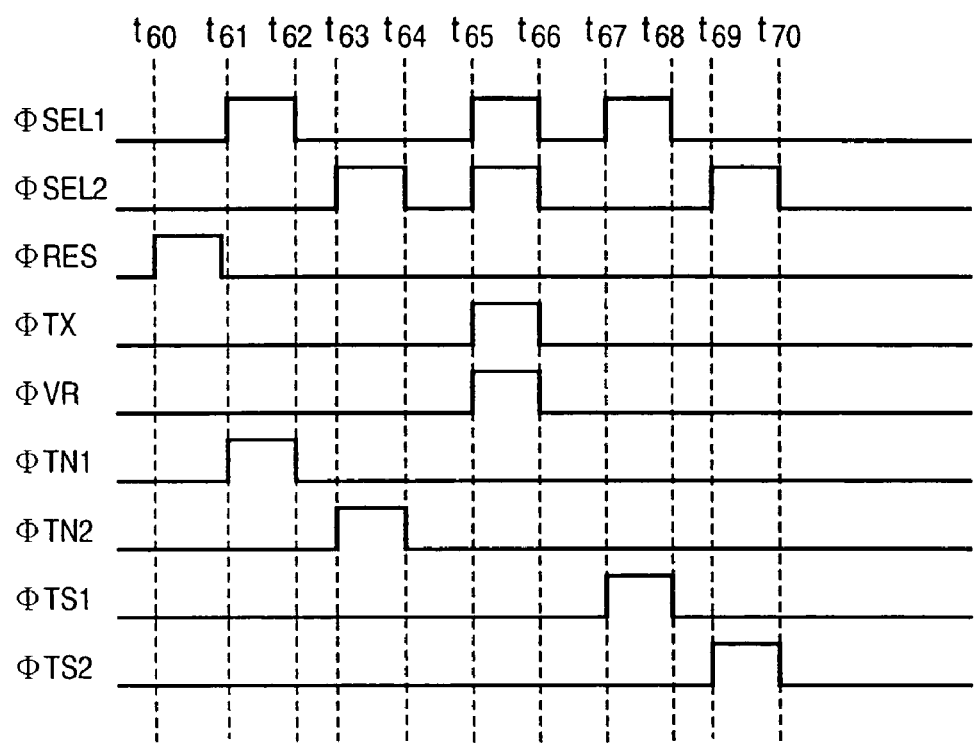
FIG. 10 is a timing chart showing operation timing according to a sixth embodiment of the present invention.
Figure 11:
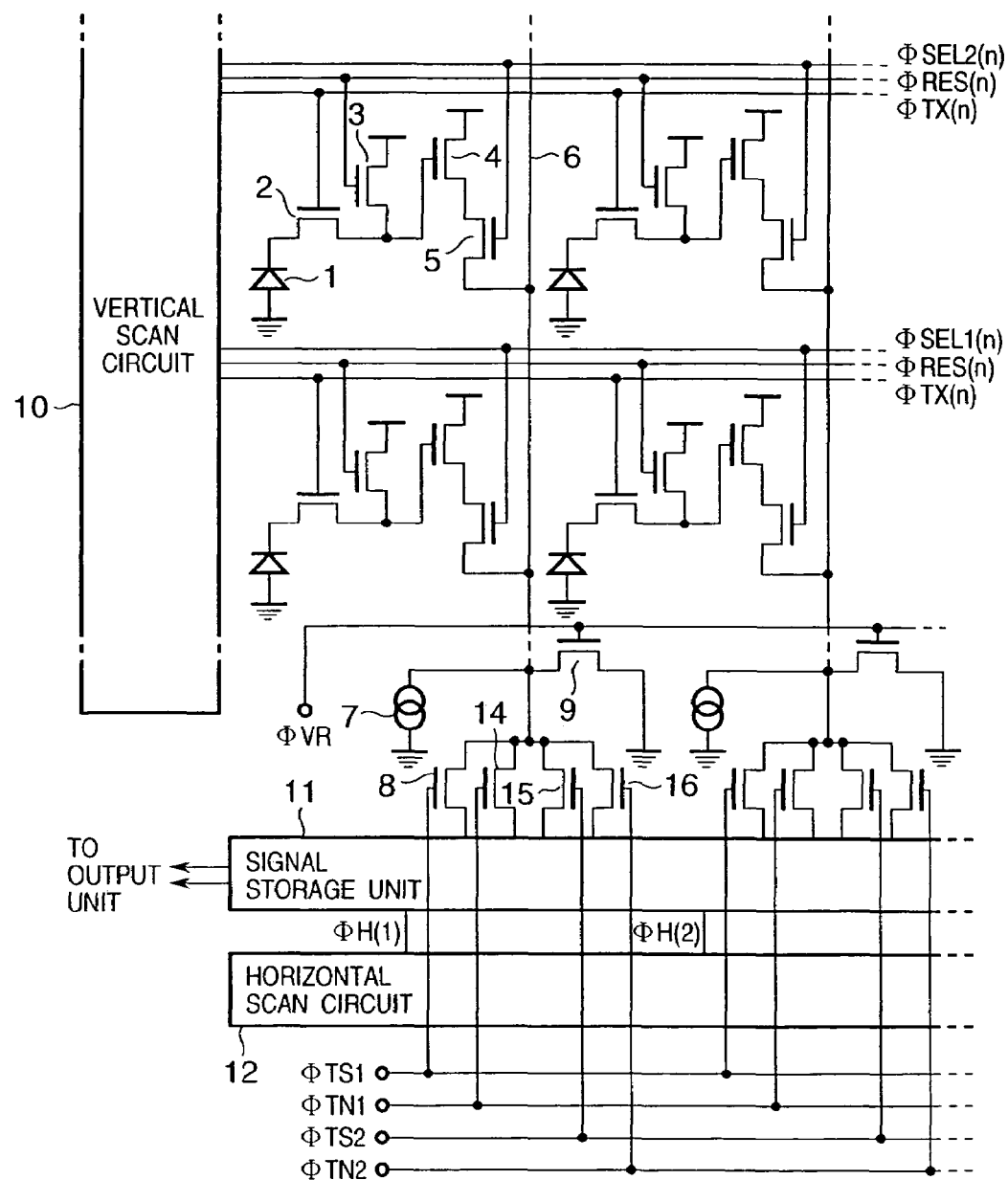
FIG. 11 is a circuit diagram of a part of a solid-state image sensing apparatus according to the sixth embodiment of the present invention.

Next, an example of operating a solid-state image sensing apparatus as shown in FIG. 11 in accordance with timing shown in FIG. 10 is explained in the sixth embodiment.

First, a circuit configuration of the solid-state image sensing apparatus as shown in FIG. 11 is explained. Each pixel includes a photodiode 1, a transfer switch 2, a reset switch 3, a pixel amplifier 4, and a row selection switch 5 and a plurality of such pixels are connected as shown in FIG. 11, similarly to FIG. 9. Note, only four pixels are shown in FIG. 11, however, a number of pixels are arranged in practice. When the row selection switch 5 is turned on, a source follower, configured with a source of load current 7 and the pixel amplifier 4, starts operating, and signals of a selected row are transferred to respective vertical output line 6. The signals are stored in signal storage unit 11 via respective transfer gates 8, 14, 15, or 16. The signals, temporarily stored in the signal storage unit 11, are sequentially transferred to an output unit via a horizontal scan circuit 12. Further, vertical-output-line reset switches 9 for resetting the vertical output lines 6 to a fixed potential are also provided. In this solid-state image sensing apparatus, signals in the even-number rows and signals in the odd-number rows are separately transferred to the signal storage unit 11 using the transfer gates 8, 14, 15 and 16. Accordingly, it is possible to read out signals of two rows during horizontal blanking period.

Figure 12:
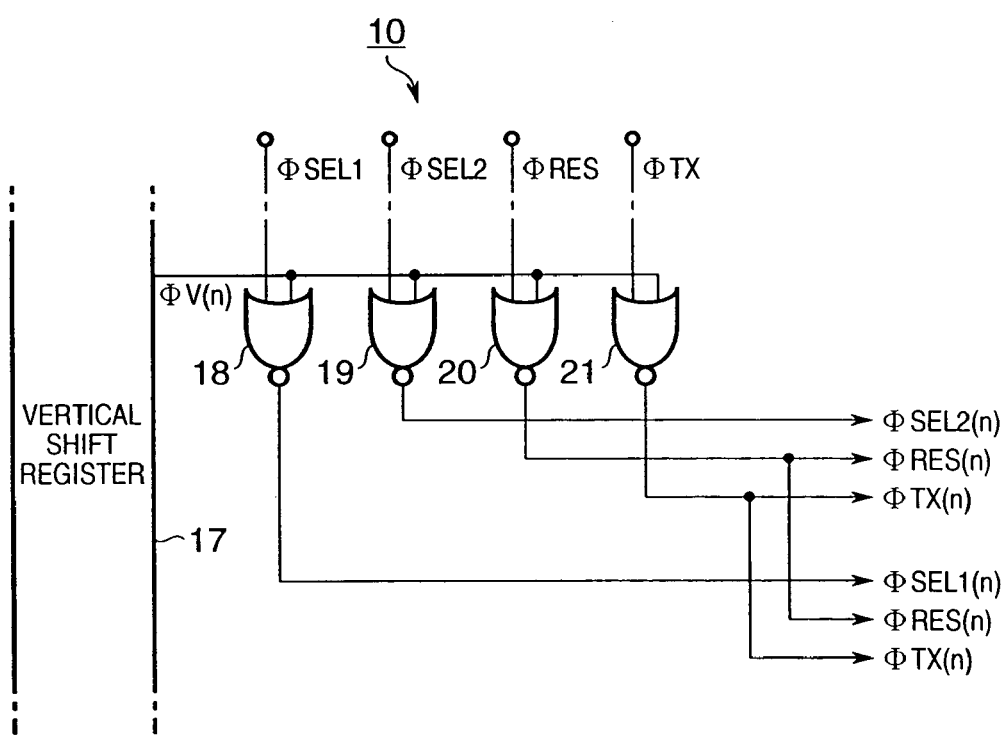
FIG. 12 is a conceptual view of a configuration of a vertical scan circuit of the solid-state image sensing apparatus shown in FIG. 11.

FIG. 12 is a view showing a configuration of a part of a vertical scan circuit 10 of the solid-state image sensing apparatus shown in FIG. 11. With a signal ΦSEL1 for selecting the odd-number rows and a signal ΦSEL2 for selecting the even-number rows which are independently provided, signals of two rows are transferred to the signal storage unit 11 in the single horizontal blanking period. More specifically, the vertical scan circuit 10 includes a vertical shift register 17 which outputs a pulse signal V(n) for selecting a n-th pair of adjoining odd- and even-number rows, and plural sets of NOR gates 18 to 21, each pair corresponds to each even-and-odd-number-row pair. A pulse signal ΦV(n) from the vertical shift register 17, configured within the vertical scan circuit 10, is inputted to one terminal of each of the NOR gates 18 to 21 of the n-th set, and the row selection signals ΦSEL1 and ΦSEL2, a reset signal ΦRES, and a transfer signal ΦTX, all of which are generated in the vertical scan circuit 10, are provided to the other terminals of the NOR gates 18 to 21, respectively. When the pulse signal V(n), selecting the n-th pair of rows, is inputted, then the NOR gates 18 to 21 outputs selection signals ΦSEL1 (n) and ΦSEL2 (n) to the corresponding rows, and a reset signal ΦRES (n) and a transfer signal ΦTX(n) to both of the even and rows of the n-th pair for operating the respective pixels.

Next, the case of operating the solid-state image sensing apparatus as shown in FIG. 11 in accordance with operation timing shown in FIG. 10 is explained below. Note, except the signals ΦRES1 and ΦRES2, ΦTS1 and ΦTS2, and ΦTN1 and ΦTN2, which are respectively applied for an odd row and an even row, all the other signals are simultaneously applied to both even- and odd-number rows. Considering an odd-number row, first, a signal ΦRES becomes high at $t_{60}$, then the gate of the pixel amplifier 4 is reset to a reset potential (potential of pulse ΦRES minus threshold potential). Thereafter, the signals ΦSEL1 and ΦTN1 becomes high at time $t_{61}$, and noise in the odd-number row is read out to the signal storage unit 11. After reading the noise signals of the odd-number row, the signals ΦSEL1 and ΦTN1 are changed to low at time $t_{62}$, and the signals ΦSEL2 and ΦTN2 are changed to high at time $t_{63}$, and noise in the even-number row is read out to the signal storage unit 11 by the time $t_{64}$.

After reading the noise signals of the even-number row, the signals ΦSEL1, ΦSEL2, and ΦVR become high at time $t_{65}$, thereby the vertical output line 6 is reset. Note, in the sixth embodiment, the reset potential is the ground potential. Under this state, a signal ΦTX is changed to high, and photo-charge is transferred from the photodiode 1 to the gate of the pixel amplifier 4. As the photo-charge is transferred, the gate potential of the pixel amplifier 4 decreases, however, since the signals ΦSEL1 and ΦSEL2 are high and the row selection switch 5 is on, the source of the pixel amplifier 4 is fixed to the ground voltage through the row selection switch 5 and the pixel amplifier 4 is always in the on-state during transferring the photo-charge. Photo-charges in an odd-number row and an even-number row are read out to the signal storage units 11 by sequentially changing the signals ΦSEL1 and ΦTS1, and ΦSEL2 and ΦTS2 to high (at times $t_{67}$, $t_{68}$, $t_{69}$, $t_{70}$).

By repeating the aforesaid operation, photo-charge signals are sequentially read out for a frame image.

As a modification of the sixth embodiment, by adding the photo-charge signals of consecutive even- and odd-number rows, it is possible to obtain signals conforming to a moving image.

In the conventional operation method, since the source of the pixel amplifier 4 is in the floating state while transferring photo-charge to the gate of the pixel amplifier 4, the pixel amplifier 4 is turned off when large photo-charge is transferred. In contrast, the pixel amplifier 4 is fixed to the on-state in the sixth embodiment, the maximum allowable charge Qsat is increased by 45% comparing to the conventional operation method.

According to the first to sixth embodiments as described above, photo-charge is transferred to the gate of a MOS transistor, used as the pixel amplifier 4, in the optimum operation region of the MOS transistor by supplying operation pulses in various ways, the MOS transistor operates in the triode region where the MOS transistor operates linearly, thereby it is possible to read out the photo-charge while widening a dynamic range of the pixel amplifier 4.

Therefore, in the operation methods for operating solid-state image sensing apparatuses as described above, it is possible to increase the maximum allowable charge Qsat.

The foregoing embodiments can be generally applied to any type of solid-state image sensing apparatus having a photoelectric conversion element, a field effect transistor whose gate receives photo-charge, and a transfer switch for controlling the connection between the photoelectric conversion element and the gate of the field effect transistor in each pixel unit, and the maximum allowable charge Qsat which can be dealt with by a source-follower type amplifier and the field effect transistor for inverse amplification is increased, thereby the dynamic range is widened. Accordingly, high-quality image signals of high S/N ratio can be obtained.

Seventh Embodiment

Figure 13:
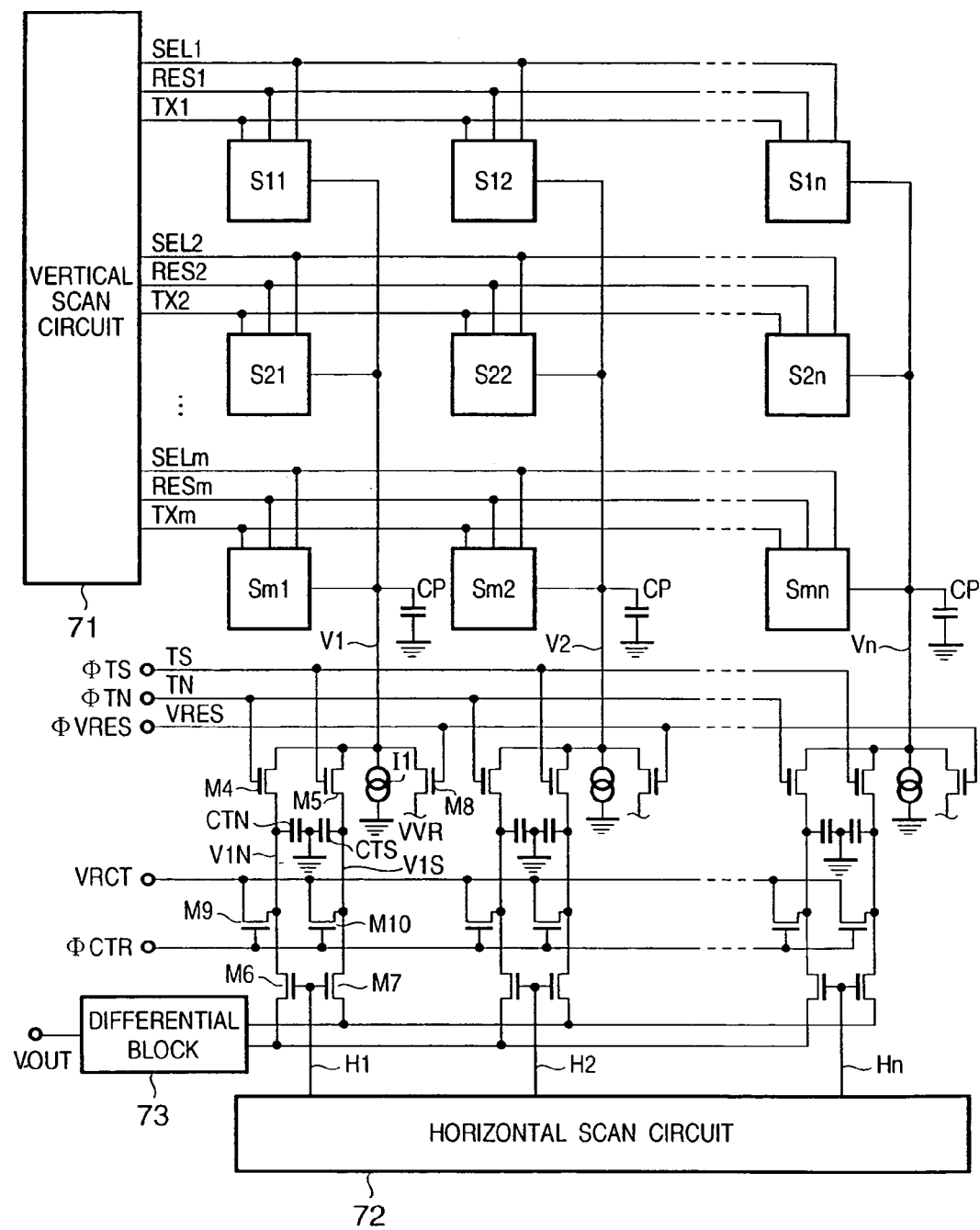
FIG. 13 is a block diagram illustrating a configuration of a solid-state image sensing apparatus according to a seventh embodiment of the present invention.
Figure 14:
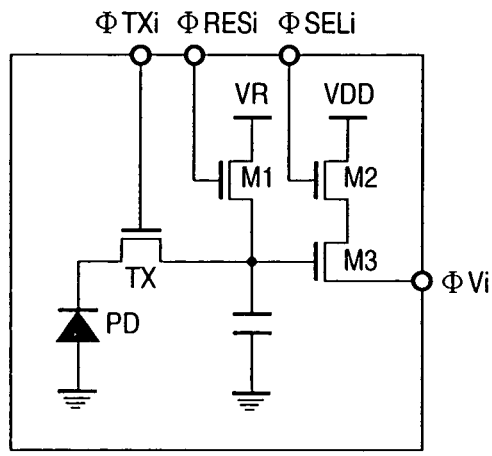
FIG. 14 is a circuit diagram illustrating a main configuration of a pixel.

FIG. 13 is a block diagram illustrating a configuration of a solid-state image sensing apparatus according to the seventh embodiment, and FIG. 14 is a circuit diagram illustrating a basic configuration of a pixel. A plurality of such pixels are formed on a single semiconductor substrate made of, e.g., mono-crystalline silicone, in CMOS LSI processing in accordance with a manufacturing technique of a semiconductor integrated circuit, and collectively called as "CMOS sensor" in general. Further, in the seventh embodiment, pixels S11 to Smn of the solid-state image sensing apparatus, arranged in m rows and n columns are explained, and there is no limitation on the numbers of rows and columns.

First, the basic configuration of each of the pixels S11 to Smn is explained with reference to FIG. 14. The anode of a photodiode PD which generates photo-charge is grounded in the seventh embodiment. The cathode of the photodiode PD is connected to the gate of a MOS transistor M3 for amplification (referred to as "MOS amplifier" hereinafter) via a charge transfer switch TX. Further, to the gate of the MOS amplifier M3, the source of a MOS transistor M1 (referred to as "reset MOS" hereinafter) for resetting the MOS amplifier M3 is connected. To the drain of the reset MOS M1, a reset voltage VR is provided. Further, the drain of the MOS amplifier M3 is connected to a MOS transistor M2 (referred to as "MOS selector" hereinafter) to select a row to which an operation voltage VDD is applied.

Next, referring to FIG. 13, the configuration of the solid-state image sensing apparatus according to the seventh embodiment will be explained. The gates of charge transfer switches TX of the pixels S11 to Smn are connected to first row selection lines (vertical scan lines) TX1 to TXm each extending in the horizontal direction. For instance, the gates of charge transfer switches TX of pixels S11 to S1n in the first row are connected to the first row selection line TX1, and similarly, the gates of charge transfer switches TX of pixels Si1 to Sin (i is an arbitrary integer) in the i-th row are connected to the first row selection line TXi. Further, the gates of the MOS transistors M1 of the pixels S11 to S1n are connected to a second row selection line (vertical scan line) RES1 which also extends in the horizontal direction. Similarly, the gates of MOS transistors M1 of pixels Si1 to Sin in the 1-th row are connected to the second row selection line RESi.

Further, the gates of the MOS transistors M3 of the pixels S11 to S1n are connected to a third row selection line (vertical scan line) SEL1 which also extends in the horizontal direction. Similarly, the gates of MOS transistors M3 of pixels Si1 to Sin in the i-th row are connected to the third row selection line SELi. These first to third row selection lines TXi, RESi, and SELi are connected to a vertical scan circuit 71, and applied with voltage signals in accordance with the following operation timing shown in FIG. 15. To the first to third row selection lines, signals ΦTX1 to ΦTXM, ΦRES1 to ΦRESm, and ΦSEL1 to ΦSELm are provided from the vertical scan circuit 71.

The sources of the MOS transistors M3 of the pixels S11 to Sm1 are connected to a vertical signal line V1 which extends in the vertical direction. Similarly, the sources of the MOS transistors M3 of pixels S1j to Smj (j is an arbitrary integer) in the j-th column are connected to a vertical signal line Vj. Further, taking the vertical signal line V1 as an example, it is connected to a constant current source I1 which is a load, as well as applied with a vertical line reset voltage VVR via a MOS transistor M8, when it is on, for resetting the vertical signal line V1. Further, the vertical signal line V1 is connected to a capacitor CTN for temporarily storing a noise signal via a noise signal transfer switch M4, and to a capacitor CTS for temporarily storing a photo-charge signal via a photo-charge signal transfer switch M5. The other side of the capacitors CTN and CTS are grounded. A node VIN between the noise signal transfer switch M4 and the capacitor CTN, and a node VIS between the photo-charge signal transfer switch M5 and the capacitor CTS are provided with a voltage VRCT via capacitor reset switches M9 and M10, respectively, when they are on, further, connected to a differential block 73 for taking the difference between the photo-charge signal and the noise signal via horizontal transfer switches M6 and M7, respectively. The gates of the horizontal transfer switches M6 and M7 are both connected to a column selection line H1, further connected to a horizontal scan circuit 72. For each of the other vertical signal lines V2 to Vn shown in FIG. 13, the identical circuit for reading signals is configured.

Further, the gates of the vertical line reset switches M8, the noise signal transfer switches M4, and the photo-charge signal transfer switches M5, which are provided for each of the vertical signal lines V1 to Vn, are connected to lines VRES, TN, and TS, respectively, to which signals ΦVRES, ΦTN, and ΦTS are provided, respectively.

Next, the operation of the image sensing apparatus as shown in FIG. 13 will be explained below with reference to FIG. 15. Here, a case of reading signals from the pixels in the first row is explained as an example.

In advance of reading of a photo-charge signal from each photodiode PD, the signal ΦRES1, applied to the gates of the reset MOS M1 in the first row, and the signal ΦVRES, applied to the gates of the MOS transistors M8, become high before time $t_{71}$. Accordingly, the gates of the MOS amplifier M3 are reset to the voltage VR, and the vertical signal lines V1 to Vn are reset to the voltage VVR. After the signal ΦRES1, applied to the gates of the reset MOS M1, and the signal ΦVRES, applied to the gates of the MOS transistors M8, are changed to low at time $t_{71}$, the signal ΦSEL1, applied to the gates of the MOS selectors M2 in the first row, and the signal ΦTN applied to the gates of the noise signal transfer switches M4 become high at time $t_{72}$. Accordingly, the reset signal VR is superposed with a reset noise, and multiplied by a gain A by the MOS amplifiers M3, further shifted by a gate-source voltage VGS of the MOS amplifiers. Then, the resultant noise signals are read out to the respective capacitors CTN. The noise signal (voltage) V1N is expressed by the following equation.

$$VIN = A \times (VR - VGS) \qquad (6)$$

Note, the gate-source voltage VGS varies depending upon a threshold voltage Vth of each MOS amplifier M3 in each pixel, as described above.

Thereafter, the signal ΦSEL1, applied to the gates of the MOS selectors M2, and the signal ΦTN applied to the gate of the noise signal transfer switches M4 are changed to low at time $t_{73}$.

At this time, the voltages of the vertical signal lines V1 to Vn gradually decrease as they are discharged at a time constant determined by parasitic capacitances CP of the vertical signal lines V1 to Vn and the constant current sources (I1). Since the constant current source (I1) is connected to each vertical signal line, even though the voltage VVR for resetting the vertical signal lines V1 to Vn is set to a substantially high voltage and the MOS amplifiers M3 are in the off state at the start of reading signals, the voltages of the vertical signal lines V1 to Vn decrease due to the constant current, and the MOS amplifiers M3 are eventually turned on, thus the signals are read out. Therefore, there is no limitation on the level of reset voltage for the vertical signal lines V1 to Vn.

Next, before transferring the photo-charges, the signal ΦVRES, applied to the gates of the MOS transistors M8, are changed to high at time $t_{74}$, and the vertical signal lines V1 to Vn are reset to the voltage VVR again. Accordingly, an initial voltage of the vertical signal lines V1 to Vn for reading photo-charge is set to the same voltage as that for reading the noise signals. Therefore, when it is not possible to take a sufficient period since noise signals are read until photo-charges are transferred, an initial potential of the vertical signal line when outputting a noise signal and an initial potential of the vertical signal line when outputting a photo-charge signal are identical; therefore, noise reduction operation, which will be explained later, is performed at high precision.

Thereafter, the signal ΦTXL applied to the gates of the charge transfer switches TX in the first row becomes high at time $t_{75}$, and the photo-charge generated by the photodiode PD is transferred to the gates of the respective MOS amplifiers M3. After the signal ΦTXL applied to the gates of the charge transfer switches TX is changed to low at time $t_{76}$ and the signal ΦVRES applied to the gates of the MOS transistors M8 is changed to low at time $t_{77}$, the signals ΦSEL1, applied to the gates of the MOS selectors M2 in the first row, and the signal ΦTS applied to the gates of the photo-charge signal transfer switches M5 become high at time $t_{78}$. Accordingly, the photo-charge signal (voltage) Vsig is amplified by the gain A of the corresponding MOS amplifier M3 and shifted by a gate-source voltage of the MOS amplifier M3, and a resultant voltage is read out to the capacitor CTS. The output voltage V1S is expressed by the following equation (7).

$$V1S = A \times (Vsig - VGS) \quad (7)$$

Thereafter, the signal ΦSEL1, applied to the gates of the MOS selectors M2, and the signal ΦTS, applied to the gates of the photo-charge signal transfer switches M5, are changed to low at time $t_{79}$. At this time, the voltages of the vertical signal lines V1 to Vn gradually decrease as they are discharged at a time constant determined by parasitic capacitances Cp of the vertical signal lines V1 to Vn and the constant current sources (I1).

Then, the signal ΦVRES, applied to the gates of the MOS transistors M8, becomes high at time $t_{710}$, thereby the signal lines V1 to Vn are reset. With the aforesaid operation, the noise signals and photo-charge signals of the pixels S11 to S1n, connected to the first row, are stored in the capacitors CTN for storing noise signals and the capacitors CTS for storing photo-charge signals, each provided for the respective columns.

Thereafter, the gates of the horizontal transfer switches M6 and M7 are sequentially changed to high in response to signals H1 to Hn provided from the horizontal scan circuit 72 at time $t_{711}$, and the voltages stored in the capacitors CTN and CTS are sequentially outputted to the differential block 73. The differential block 73 takes the differences between the photo-charge signals V1S to VnS and the corresponding noise signals V1N to VnN, and sequentially outputs the differences as a voltage VOUT. For example, the output voltage VOUT of the first column is expressed by the following equation, obtained by subtracting equation (6) from equation (7).

$$VOUT = V1S - V1N = A \times (Vsig - VR) \quad (8)$$

Therefore, photo-charge signals from which variation in threshold voltages Vth of the MOS amplifiers is reduced for the pixels are outputted. Further, on the right-hand side of equation (8), reset noise is included both in the terms Vsig and VR, therefore, the reset noise is canceled out, and photo-charges generated by the photodiodes PD are amplified and outputted as the output voltages VOUT.

With the aforesaid operation, reading of photo-charges from the pixels in the first row is completed. After this, in advance of reading the photo-charges from the second row, a signal ΦCTR, applied to the gates of the reset switches M9 and M10, becomes high, and the gates are reset to the voltage VRCT, and photo-charges of the pixels S21 to S2n connected in the second row are read out. Thereafter, photo-charges of the pixels S31 to Smn connected to the third to m-th row are sequentially read out in response to signals provided from the vertical scan circuit 71 in the similar manner as described above, and photo-charges are read out from all the pixels.

Regarding the gain A in equation (8), since a source-follower type amplifier has the MOS amplifier M3 whose load is the current source I1, the gain is about 1. Therefore, when the gain of the differential block is set to 1, an unprocessed voltage difference between a photo-charge signal and a noise signal is outputted. Further, since variation in the threshold voltages of the MOS amplifiers M3 and variation in threshold voltages of the reset MOS M1, as well as reset noise are reduced, an image signal of high S/N ratio can be obtained.

Further, in the seventh embodiment as described above, in reading a noise signal and a photo-charge signal to the capacitors CTN and CTS, a capacitive division configuration is not adopted; thus, the capacitances of the capacitors CTN and CTS are not affected by the parasitic capacitance of the vertical output lines, and a small-size solid-state image sensing apparatus as well as high speed reading of the solid-state image sensing apparatus are realized.

Eighth Embodiment

Next, the eighth embodiment will be explained.

Figure 16:
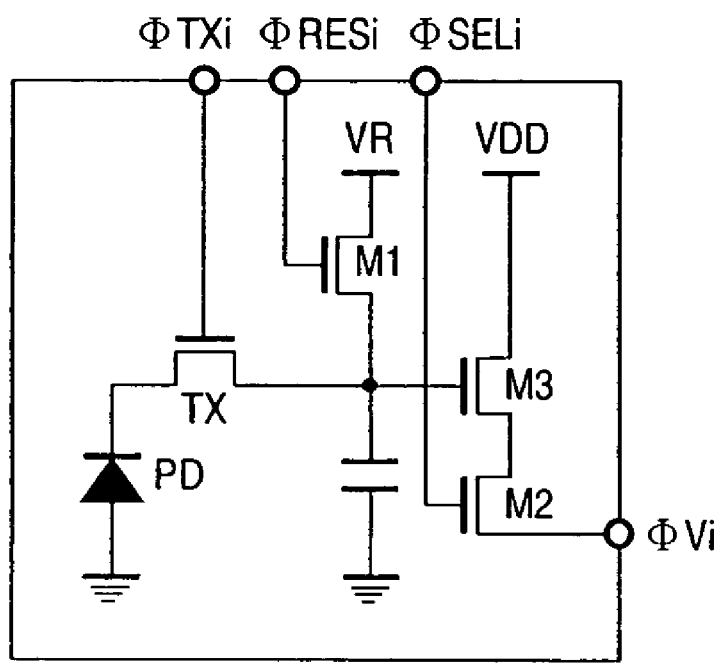
FIG. 16 is a circuit diagram illustrating a main portion of a pixel according to an eighth embodiment of the present invention.

FIG. 16 is a circuit diagram illustrating a basic configuration of a pixel according to the eighth embodiment of the present invention. Referring to FIG. 16, the basic configuration of each pixel is explained. In FIG. 16, units and elements are those shown in FIG. 14 are referred to by the same references, and a plurality of such pixels are arranged as shown in FIG. 13. Pixels and peripheral circuits are manufactured in CMOS LSI processing, and collectively called as "CMOS sensor".

Photodiodes may be formed while forming a source-drain diffusion layer. However, since the photodiodes in the pixels according to the eighth embodiment of the present invention are complete depletion type buried photodiodes, processes for forming the photodiodes are added to standard CMOS LSI processing. With the complete depletion type photodiodes, photo-charges of good linearity can be obtained.

In FIG. 16, the anode of the photodiode PD which generates photo-charge is grounded. The cathode of the photodiode PD is connected to the gate of the MOS amplifier M3 via the charge transfer switch TX. Further, to the gate of the MOS amplifier M3, the source of the reset MOS M1 for resetting the gate of the MOS amplifier M3 is connected, and the drain of the reset MOS M1 is applied with the reset voltage VR. Further, the drain of the MOS amplifier M3 is applied with the operation voltage VDD, and the source is connected to the MOS selector M2 for connecting the MOS amplifier M3 to the vertical signal line. Since the MOS selector M2 is connected to the source of the MOS amplifier M3, it is possible to widen the dynamic range in the VDD side, compared against the pixel circuit shown in FIG. 14.

It should be noted that, in the solid-state image sensing apparatus shown in FIG. 13 having the pixels shown in FIG. 16, and the same effects as those of the seventh embodiment are obtained by operating the apparatus in the same manner as that explained in the seventh embodiment.

Figure 15:
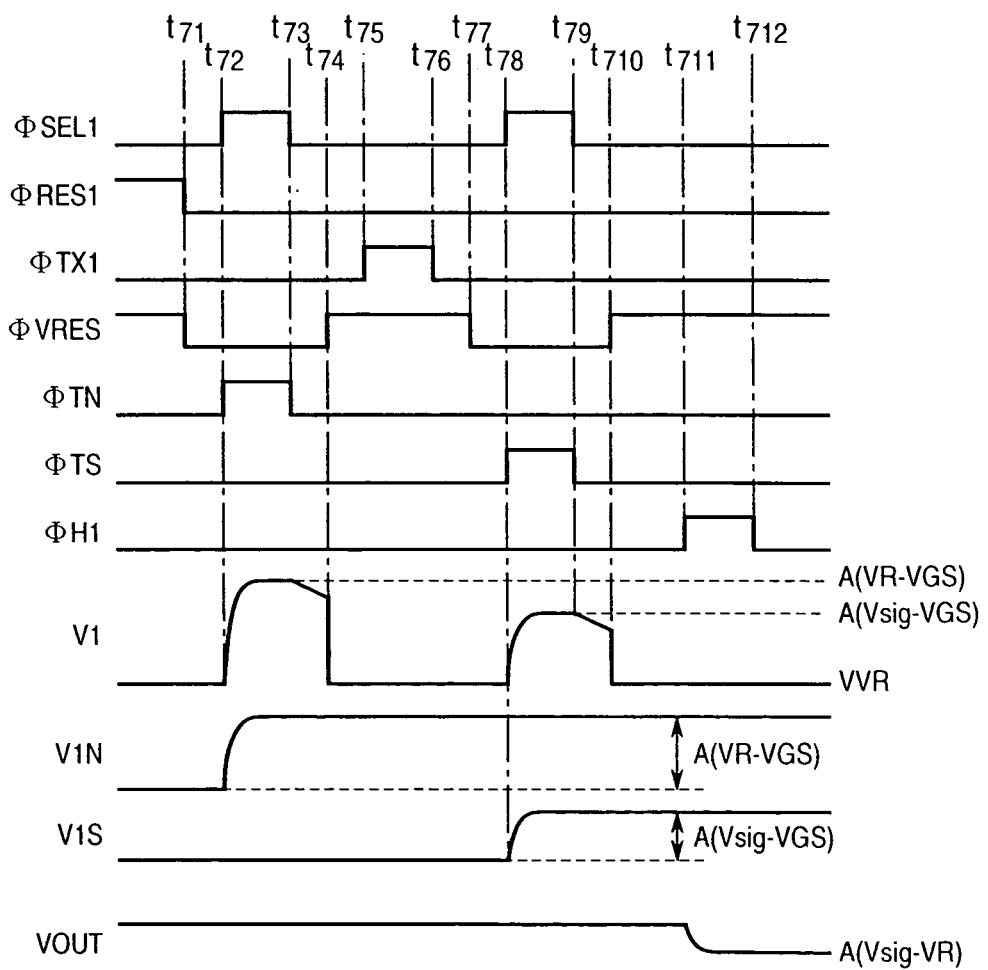
FIG. 15 is a timing chart showing operation timing according to the seventh embodiment of the present invention.

By operating the solid-state image sensing apparatus according to the eighth embodiment in accordance with operation timing as shown in the timing chart in FIG. 15, noise signals of the respective pixels are read-out in a period between time $t_{72}$ and time $t_{73}$ photo-charge signals are read out in a period between time $t_{78}$ and time $t_{79}$, and the output signals VOUT, which are the differences between the photo-charge signals and the noise signals, are obtained by the differential block 73.

The output signals VOUT do not include components of threshold voltages Vth of the MOS transistors M1 and M3, thus, fixed pattern noise of the CMOS sensor, which has been considered as a problem, is reduced. The both terms Vsig and VR in the right hand side of equation (8) include reset noise, therefore, the reset noise is canceled out. As a result, a component of the photo-charge generated by the photodiode PD is converted to a voltage, i.e., the output voltage VOUT. Therefore, noise due to variation in the threshold voltage of the amplifier is also reduced, thereby an image signal of high S/N ratio can be obtained.

Further, high-density integration of the CMOS sensor including the vertical scan circuit and the horizontal scan circuit becomes possible, which enables to produce a small-sized image sensor consuming low electrical energy.

Furthermore, since complete depletion type buried photodiodes are used, photo-charges of good linearity can be obtained.

Figure 17:
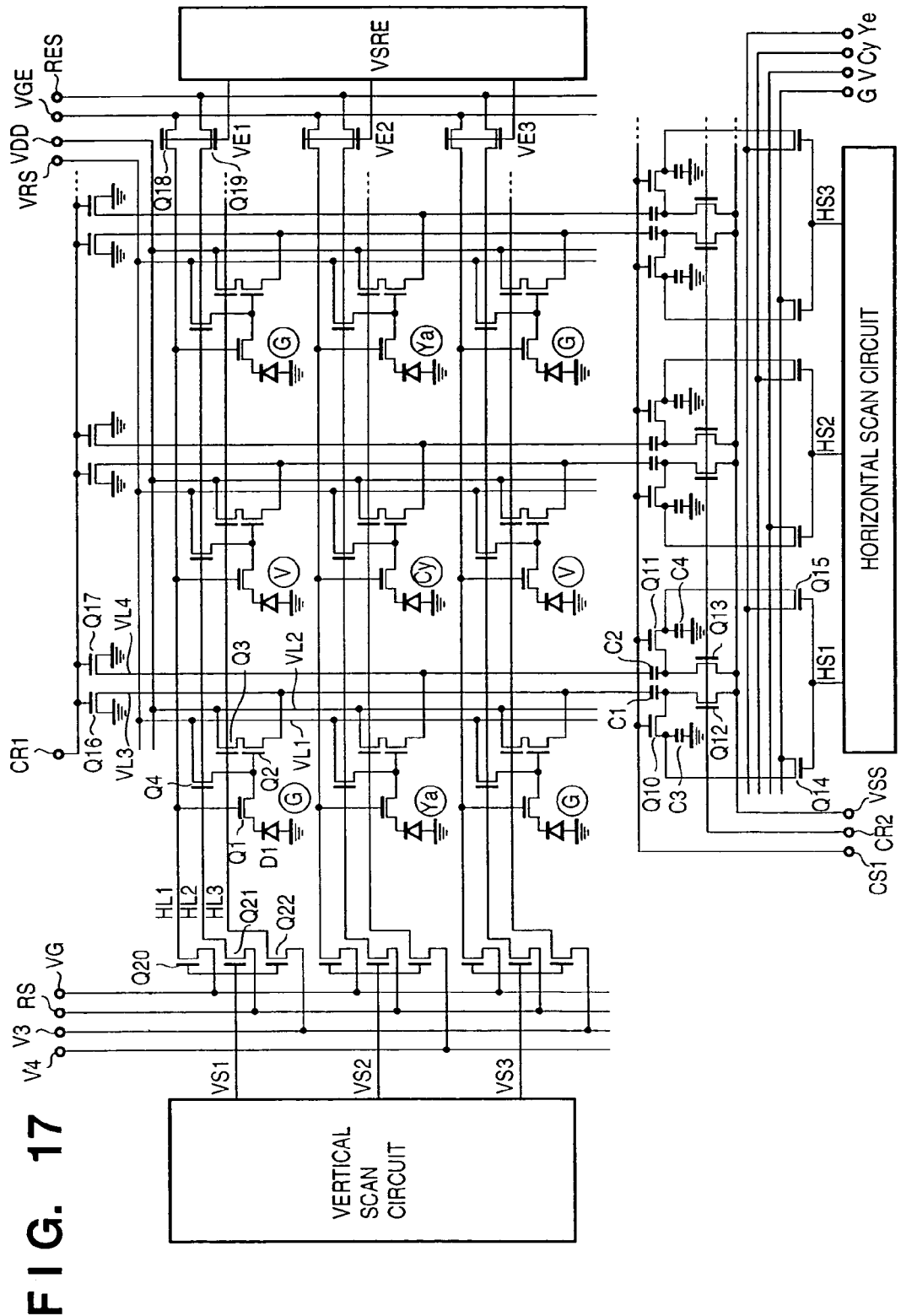
FIG. 17 is a circuit diagram of a conventional solid-state image sensing apparatus.

According to the seventh and eight embodiments as described above, a load for a MOS amplifier is provided and a signal is temporary stored in a capacitor via a source follower, thus, better sensitivity is achieved with a smaller capacitance of the capacitor than a clamping capacitor C1 (FIG. 17). Accordingly, the chip size of a solid-state image sensing apparatus can be reduced.

A switch for resetting each vertical signal line is provided and, in advance of reading of a photo-charge signal after reading a noise signal, the vertical signal line is reset to a predetermined reset voltage. Thus, the initial potential of the vertical signal line when outputting a noise signal and the initial potential of the vertical signal line when outputting a photo-charge signal become identical even when reading these signals at high speed. Accordingly, noise can be easily reduced at high precision.

Further, by providing a load for the MOS amplifier, even when the reset voltage for resetting the vertical signal line is set relatively high and the MOS amplifier is in the off state in an early stage of reading a photo-charge signal, the voltage of the vertical signal line decreases in response to the constant current of the load, and the MOS amplifier is eventually turned on. Accordingly, the photo-charge signal is read out. Therefore, there is no limitation on the reset voltage to be applied to the vertical signal line.

Furthermore, each vertical signal line is reset before reading noise as well as before reading photo-charge, thus the vertical signal line is refreshed each time signals is read from a pixel. Accordingly, it is possible to restrict interference between adjoining pixels as well as prevent cross modulation and blooming.

Note that, in the above embodiments, NMOS transistors are mainly used in the circuits, however, the present invention is not limited to this, and it is possible to use PMOS transistors in place of the NMOS transistors. Further, the field effect transistors are not limited to the MOS type.

As many apparently widely different embodiments of the present invention can be made without departing from the spirit and scope thereof, it is to be understood that the invention is not limited to the specific embodiments thereof except as defined in the appended claims.

What is claimed is:

1. A solid-state image sensing apparatus comprising:
   a plurality of pixels each including a photoelectric conversion element, a field effect transistor whose gate receives photo-charge signals generated by said photoelectric conversion element, a first switch adapted to control a connection between said photoelectric conversion element and the gate of said field effect transistor, and a first reset circuit adapted to reset the gate of said field effect transistor;
   output lines adapted to transfer respective outputs from said field effect transistors;
   loads provided on said output lines for said field effect transistors;
   second reset circuits adapted to reset said output lines to a predetermined voltage not equal to ground voltage;
   driving circuits adapted to reset said output lines, to transfer to said output lines said first signals obtained from said field effect transistors by resetting the gates of said field effect transistors, to turn on said first switches and reset said output lines while transferring said photo-charge signals to the gates of said field effect transistors, and then to transfer second signals from said field effect transistors to said output lines;
   a first capacitor adapted to store temporarily an output from said field effect transistor transferred to a respective said output line; and
   a second switch adapted to control transference of the output from said output line to said first capacitor.

2. A solid-state image sensing apparatus comprising:
   a plurality of pixels each including a photoelectric conversion element, a field effect transistor whose gate receives photo-charge signals generated by said photoelectric conversion element, a first switch adapted to control a connection between said photoelectric conversion element and the gate of said field effect transistor, and a first reset circuit adapted to reset the gate of said field effect transistor;
   output lines adapted to transfer respective outputs from said field effect transistors;
   loads provided on said output lines for said field effect transistors;
   second reset circuits adapted to reset said output lines to a predetermined voltage not equal to ground voltage;
   driving circuits adapted to reset said output lines, to transfer to said output lines said first signals obtained from said field effect transistors by resetting the gates of said field effect transistors, to turn on said first switches and reset said output lines while transferring said photo-charge signals to the gates of said field effect transistors, and then to transfer second signals from said field effect transistors to said output lines;
   a first capacitor adapted to store temporarily the first signal transferred to each of said output lines;
   a second switch adapted to control transference to said first capacitor;
   a second capacitor adapted to store temporarily the second signal transferred to each of said output lines; and
   a third switch adapted to control transference to said second capacitor.

3. The solid-state image sensing apparatus according to claim 1, each pixel further comprising a fourth switch, arranged between said field effect transistor and a power supply, adapted to select a row.

4. The solid-state image sensing apparatus according to claim 1, each pixel further comprising a fourth switch, arranged between said field effect transistor and said output line, adapted to select a row.

5. The solid-state image sensing apparatus according to claim 2, each pixel further comprising a fourth switch, arranged between said field effect transistor and a power supply, adapted to select a row.

6. The solid-state image sensing apparatus according to claim 2, each pixel further comprising a fourth switch, arranged between said field effect transistor and said output line, adapted to select a row.

* * * * *

UNITED STATES PATENT AND TRADEMARK OFFICE
CERTIFICATE OF CORRECTION

PATENT NO. : 6,963,372 B1
DATED : November 8, 2005
INVENTOR(S) : Hiroki Hiyama et al.

Page 1 of 1

It is certified that error appears in the above-identified patent and that said Letters Patent is hereby corrected as shown below:

Title page,
Item [56], References Cited, FOREIGN PATENT DOCUMENTS,
delete "JP    5-18309    3/1983" and insert -- JP    5-18309    3/1993 -- ; and
delete "JP    4-61573    2/1992".

Column 2,
Line 42, delete "$t^{35p}$," and insert -- $t_{35p}$, --.

Column 3,
Line 29, delete "drop" and insert -- drop of --.

Column 9,
Line 45, delete "$t_{251}$" and insert -- $t_{25}$, --.

Signed and Sealed this

Eleventh Day of April, 2006

JON W. DUDAS
*Director of the United States Patent and Trademark Office*